(12) United States Patent
Schindler et al.

(10) Patent No.: US 8,737,349 B2
(45) Date of Patent: May 27, 2014

(54) HANDOVER PROCESS AND INFORMATION SUPPORT FOR COMMUNICATION TRANSFER BETWEEN TELECOMMUNICATION NETWORKS

(75) Inventors: Sigram Schindler, Berlin (DE); Juergen Schulze, Berlin (DE); Doerte Schoenberg, Berlin (DE)

(73) Assignee: Sigram Schindler Beteiligungsgesellschaft mbH, Berlin (DE)

( * ) Notice: Subject to any disclaimer, the term of this patent is extended or adjusted under 35 U.S.C. 154(b) by 703 days.

(21) Appl. No.: 11/949,173

(22) Filed: Dec. 3, 2007

(65) Prior Publication Data

US 2009/0147750 A1   Jun. 11, 2009

Related U.S. Application Data

(60) Provisional application No. 60/868,159, filed on Dec. 1, 2006, provisional application No. 60/892,272, filed on Mar. 1, 2007, provisional application No. 60/943,347, filed on Jun. 12, 2007, provisional application No. 60/950,069, filed on Jul. 16, 2007.

(30) Foreign Application Priority Data

| Date | | Number |
|---|---|---|
| Dec. 1, 2006 | (DE) | 10 2006 057717 |
| Dec. 11, 2006 | (DE) | 10 2006 059142 |
| Dec. 13, 2006 | (DE) | 10 2006 059207 |
| Dec. 27, 2006 | (DE) | 10 2006 062662 |
| Dec. 28, 2006 | (DE) | 10 2006 062675 |
| Jan. 3, 2007 | (DE) | 10 2007 001321 |
| Jan. 8, 2007 | (DE) | 10 2007 001474 |
| Jan. 16, 2007 | (DE) | 10 2007 003640 |
| Jan. 22, 2007 | (DE) | 10 2007 003646 |
| Jan. 29, 2007 | (DE) | 10 2007 005224 |
| Feb. 5, 2007 | (DE) | 10 2007 006459 |
| Feb. 16, 2007 | (DE) | 10 2007 008318 |
| Mar. 1, 2007 | (DE) | 10 2007 010852 |
| Mar. 12, 2007 | (DE) | 10 2007 012683 |
| Apr. 4, 2007 | (DE) | 10 2007 016775 |
| Apr. 20, 2007 | (DE) | 10 2007 019752 |
| May 14, 2007 | (DE) | 10 2007 022874 |
| Jun. 7, 2007 | (DE) | 10 2007 011453 |
| Jun. 11, 2007 | (DE) | 10 2007 053363 |
| Jun. 12, 2007 | (DE) | 10 2007 027627 |
| Jun. 27, 2007 | (DE) | 10 2007 030580 |
| Jul. 3, 2007 | (DE) | 10 2007 031414 |
| Jul. 10, 2007 | (DE) | 10 2007 032806 |
| Jul. 16, 2007 | (DE) | 10 2007 034892 |
| Jul. 20, 2007 | (DE) | 10 2007 034290 |
| Aug. 20, 2007 | (DE) | 10 2007 039872 |
| Nov. 15, 2007 | (DE) | 10 2007 055022 |
| Nov. 27, 2007 | (DE) | 10 2007 057274 |

(51) Int. Cl.
*H04W 4/00* (2009.01)

(52) U.S. Cl.
USPC .......................................... 370/331; 370/334

(58) Field of Classification Search
USPC .................................................. 370/331, 332
See application file for complete search history.

(56) References Cited

U.S. PATENT DOCUMENTS

| | | | |
|---|---|---|---|
| 5,722,068 A | 2/1998 | Bartle et al. | |
| 5,732,347 A | 3/1998 | Bartle et al. | |
| 6,018,655 A | 1/2000 | Bartle et al. | |
| 7,184,765 B1 | 2/2007 | Birnie et al. | |
| 7,546,125 B2 * | 6/2009 | Sharma et al. | 455/436 |
| 7,574,212 B2 * | 8/2009 | McConnell et al. | 455/437 |
| 7,602,723 B2 * | 10/2009 | Mandato et al. | 370/236 |
| 7,606,570 B2 * | 10/2009 | Karaoguz et al. | 455/442 |
| 7,620,015 B2 * | 11/2009 | Lenzarini | 370/331 |
| 2003/0193910 A1 | 10/2003 | Shoaib et al. | |
| 2004/0023669 A1 * | 2/2004 | Reddy | 455/456.1 |
| 2004/0122954 A1 | 6/2004 | Shaheen | |
| 2005/0239465 A1 * | 10/2005 | Lee et al. | 455/436 |
| 2006/0084440 A1 * | 4/2006 | Bakri | 455/439 |
| 2006/0099948 A1 | 5/2006 | Hoghooghi et al. | |
| 2006/0195551 A1 * | 8/2006 | Dowling | 709/217 |
| 2006/0227746 A1 * | 10/2006 | Kim et al. | 370/331 |

| | | | | |
|---|---|---|---|---|
| 2006/0256779 A1* | 11/2006 | Lim et al. | | 370/352 |
| 2008/0130581 A1* | 6/2008 | Hwang et al. | | 370/331 |
| 2008/0132236 A1* | 6/2008 | Kiribayashi | | 455/436 |
| 2009/0046636 A1* | 2/2009 | Kwak | | 370/328 |
| 2009/0233602 A1* | 9/2009 | Hughes | | 455/436 |
| 2009/0274115 A1 | 11/2009 | Schindler et al. | | |
| 2010/0157938 A1* | 6/2010 | Jin et al. | | 370/331 |

FOREIGN PATENT DOCUMENTS

| | | |
|---|---|---|
| DE | 196 45 368 A1 | 4/1998 |
| EP | 0 929 884 B1 | 10/1999 |
| EP | 1701572 A2 | 9/2006 |
| GB | 2287614 A | 9/1995 |
| GB | 2322051 A | 8/1998 |
| JP | 2003-333639 A | 11/2003 |
| WO | 96/28947 A1 | 9/1996 |
| WO | 02/19736 A2 | 3/2002 |
| WO | 2006 124514 A2 | 11/2006 |
| WO | 2007 004846 A2 | 1/2007 |
| WO | 2008-033259 A2 | 3/2008 |

OTHER PUBLICATIONS

Wedlund et al., "Mobility Support Using SIP", pp. 1-7, archive date Mar. 24, 2006.*

Kristiansson et al., "Application-layer Mobility support for Streaming Real-time Media", 2004 Wireless Communications and Networking Conference, pp. 1-6, Mar. 2004.*

Dutta et al., "Fast-handoff Schemes for Application Layer Mobility Management", Personal, Indoor and Mobile Radio Communications, 2004. PIMRC 2004. 15th IEEE International Symposium on, pp. 1-5, Sep. 2004.*

Schiller, J., "Mobile Communications," 2003, pp. 16-17, Pearson Education Limited, Essex, England.

Chen et al., "Universal Seamless Handoff Architecture in Wireless Overlay Networks," UCLA Computer Science Department Technical Report CSD-TR No. 040012 (Date Unknown).

Gupta, "IEEE 802.21-Uebersichts-Publikation," DNC 21-06-0706-00-0000 (Date Unknown).

Mills-Tettey et al., "Mobile Voice over IP (MVOIP):An Application-level Protocol for Call Hand-off in Real Time Applications," Proceedings of the Twenty-First IEEE International Performance, Computing and Communications Conference, pp. 271-279, Apr. 2002.

Sonnenberg, "Seamless Vertical Handoff," Jun. 27, 2005.

Stefanov, "Entwurf and Implementierung einesVisualisations-software für 'Seamless Handover' in drachtlosen Netze," Universität Karlsruhe (TH), Institut für Telematik, Nov. 21, 2006.

European Office action dated May 5, 2011 in corresponding European patent application.

Notification of Reasons for Rejection dated Nov. 15, 2011 in corresponding Japanese patent application.

Notification of Reasons for Rejection dated Sep. 25, 2012 in corresponding Japanese patent application.

Translation of professor Schindler's letter dated Oct. 12, 2012 for Response to the EP Office Action.

* cited by examiner

*Primary Examiner* — Derrick Ferris
*Assistant Examiner* — Scott M Sciacca
(74) *Attorney, Agent, or Firm* — Vorys, Sater, Seymour and Pease LLP; Vincent M DeLuca

(57) ABSTRACT

An automatic and network-transparent "handover convenience information support" method for a subscriber of a primary communications process in which an handover takes place—wherein this handover process can comprise arbitrary times prior or after the "actual handover".

"Convenience information support" means that this PTCP-SUBC has not necessarily requested the convenience information, but he nevertheless regards this then unasked-for support as convenient or helpful, such as for example a passenger on a flight regarding associated announcements/references/measures at the departure or arrival airport. As opposed to such often uniform measures the convenience information is as a rule individually configurable by someone affected by it. The convenience support information for a subscriber takes place by transferring to him relevant information as regards this actual handover—which can be potential or current or retrospective—during the handover-process which was supplied for this by at least one non-human module in at least one system of at least one secondary telecommunications process.

12 Claims, 16 Drawing Sheets

HANDOVER PROCESS AND INFORMATION SUPPORT FOR COMMUNICATION TRANSFER BETWEEN TELECOMMUNICATION NETWORKS

CROSS-REFERENCE TO RELATED APPLICATION

This application is related to copending application Ser. No. 11/969,388 filed Jan. 4, 2008.

BACKGROUND OF THE INVENTION

This invention discloses an automatic and network-transparent "handover convenience information support" method (HOCIS method) for a subscriber (SUBC) of a primary communications process (PTCP) in which a handover takes place—wherein this handover process can comprise arbitrary times prior to or after the handover actual handover.

"Convenience information support" thereby means inter alia that the subscriber has not necessarily requested the convenience information, but he nevertheless as a rule regards this then unasked-for support as convenient or helpful, such as for example a passenger on a flight regarding associated announcements/references/measures (=convenience information support) at the departure or arrival airport. As opposed to such often uniform measures the convenience information is as a rule individually configurable by someone affected by it. The convenience information for such a subscriber takes place by transferring to him relevant information as regards the actual handover—which can be potential or current or retrospective—during the handover process which was supplied for this by at least one non-human module in at least one system of at least one secondary telecommunications process (STCP) for the subscribers of the primary telecommunications process.

SUMMARY OF THE INVENTION

A. Innovative Features of the Method

The state of the handover art regards a handover as a process reduced to its technical core, i.e. it considers
 (a) as a rule only the terminal system directly involved in the handover as well as where applicable its users—in any case no terminal system-user indirectly involved in a (potential or current or previous) handover is informed by the terminal system directly involved therein—and/or
 (b) as regards a handover of a terminal system only its "rudimentary connectivity"—in any case not equally the "application-connectivity" of its user in the case of its network entrance—and/or
 (c) a handover of a terminal system only as "final self-runner" on the basis of a technical presetting therefor—thus not as a process which begins arbitrarily early and is dynamically configurable anytime by a terminal system user who may totally avoid the handover.

On the other hand the convenience information support method implements—for a potential or current or previous handover inter alia the three features of a handover method identified in (a)-(c) and hitherto not considered.

Also the "service continuity" of an OSI (Open Systems Interconnection) connection to be acquired in a handover is by the
 state of the handoverart aimed for primarily by concealing this handover from the users of this OSI connection—in any case from the user indirectly involved in a handover—in mechanistic way. If the PTCP-SUBCs using this OSI connection are only simple automatons then these today as a rule even depend on such a procedure—i.e. the service continuity must here be effected inside the modules of the OSI connection of the PTCP (i.e. for the most part on their L2), otherwise it need not be provided for their user automatons—not however handover-aware SUBCs, such as people for example.
 HOCIS method aimed for by suitably making aware of this handover in the case of PTCP-SUBCs (of this OSI connection), thus in a way "based on the handover understanding" thereof. If handover-aware PTCP-SUBCs, such as people, use the OSI connection of this PTCP, then they often even depend on this method of procedure—they are then namely frequently structured mentally quite differently from simple automatons. For example handover-aware PTCP-SUBCs, such as people must as a rule want to obtain handover-relevant information before this handover actually takes place and/or want to be able to react more flexibly to same than simple automatons—so that for this an independent secondary/HOCIS telecommunications process (STCP) is appropriate in a communications technical manner which overlaps somehow temporarily with the PTCP and the handover process and provides the HOCIS for the PTCP-SUBCs. Such an STCP can then in turn include at least one HOCIS system in obtaining this service continuity—with its in many cases earlier starting and/or longer lasting connectivity for example to a PTCP-SUBC involved indirectly in the handover, which enables it to supply him "conveniently" with handover-relevant information in order to guarantee this service continuity to him.
 This service continuity is thus generated in the PTCP-SUBCs according to their needs by means of at least one secondary telecommunications process (STCP)—otherwise this service continuity is not at all to be guaranteed for them—i.e. produced outside of the modules of the OSI connection of the PTCP.

In the first case, the seamless MIHs aimed at by the state of the handover art, it would in some circumstances purely theoretically be superfluous in the case of an handover in a PTCP OSI connection to provide the users in their terminal systems with handover convenience information to guarantee the thus understood service continuity in order to thereby avoid any negative effect on these PTCP-SUBCs through this handover. However anyone knows what to make of "pure theory" in this technical engineering context—that it does in fact often stand on "feet of clay" (for this see also the third last paragraph in section B.).

As opposed to this the method according to the invention has the effect in the case of an handover in a PTCP that at least one primary telecommunications process subscriber, i.e. a user of a terminal system involved therein (of the OSI connection of this PTCP), receives at least one piece of handover-relevant information precisely for the purpose of the "convenience information support" via/with this handover—so that this handover would not have a negative influence on the PTCP, or the PTCP-SUBCs could configure it better, or totally avoid it, or . . . (see section B. for the terms just used).

In other words: The method of providing handover convenience information according to the invention achieves the "service continuity" in a handover on the level of understanding of the PTCP-SUBC (and dispenses with the illusion-bearing need or the "wishful thinking" of a large part of the state of the handover art, to be able to always completely conceal the handovers from these SUBCs in a technical way) in that it uses this handover by means of at least one non-human module in at least one HOCIS server/IAD/terminal system for this purpose (see in particular section D.).

The HOCIS method, thus owing to its objective, therefore belongs to the future and only just developing field of the "convenience" technology of technical communications, i.e. in its intentions not to the standard field of "handover technology". A HOCIS method technically has nothing in common with the handover technology since the HOCIS method
- makes it possible to solve psychological problems of the PTCP-SUBCs caused potentially or currently by handovers by making it possible at suitable points in time and in suitable displays to provide a PTCP-SUBC involved in a handover with this "convenience information support",
- but is not a method with which a handover of a PTCP terminal system could be managed—thus a technically simple problem could be solved—but it embodies a technical complexity, as is indispensable for solving this aforementioned diffuse psychic problem.

This great technical complexity of the HOCIS method is explained more particularly in section D., more particularly in the explanations there of FIG. 5.

B. Terms/Conceptuality and Essence of the Present Invention

The method of the invention wants to make handovers "convenient" when using wireless communications networks as they are today. In more precise terms: It offers the possibility of conveying to users in a simple way the convenient certainty that the invention—it is nowadays as a rule to be positioned outside of these networks—will inform them and support them during their use as regards the possible "bumpiness" of the potential and current unavoidable handovers between them permanently and in a convenient way.

The value of the HOCIS method thus follows alone from the fact that it cannot currently be foreseen
- when all present day wireless telecommunications networks, which are considered for handovers for example in telephone conversations, will allow for one of the currently discussed "seamless handover" methods,
- whether these "seamless handover" methods will then be for the subscribers of communications processes actually totally transparent (=non-perceivable/bothersome) and
- whether the market actually accepts these (perhaps only alleged) "seamless handover" methods—with its strict non-information of the communications process subscribers about a handover, even if this lasts longer or completely fails, although it can imply a cost modification—or it will prefer a HOCIS method (with its prophylactic information/support possibility for these subscribers about handovers), quite apart from the fact that this "seamless handover" philosophy in any case totally ignores the basic handover problems which arise from the foreseeable multi-overlapping of the economic regions with the most different, mostly private wireless telecommunications networks which vary very considerably both in size and also all their performance features but are as a rule easily accessible for mobile network users. This last aspect is explained in somewhat more detail at the end of this section B. and particularly by sub-section D.4.9.

For a potential or current handover of a terminal system of a primary telecommunications process (PTCP) the invention includes numerous (network-transparent) possibilities of providing human or non-human users in at least one different terminal system of this PTCP with "convenient information support" with regard to this handover, particularly the at least one subscriber (SUBC) of a PTCP indirectly involved in the handover. In many cases this HOCIS starts for a PTCP-SUBC involved indirectly in an handover without a request by him, thus has "social" features. In order to be able to describe this clearly, the terms and associated concepts required for this will now be explained.

The invention is a generic method as well as a generic apparatus for implementing the provision of handover convenience information to a subscriber with respect to a potential, actual or just completed handover process. The descriptions of the two in this written specification are—like their terms and concepts—purely functional, i.e. totally abstract, thus absolutely independent of a concrete material implementation alias embodiment. For reasons of clarity however possible material implementations of this method, of this apparatus and of these terms/concepts will be explained from time to time. It should thereby be noted that the following explanations of these terms/concepts—throughout in the sense of the OSI RM—serve to explain the essence of the method/apparatus according to the invention, thus do not aim at a basic explanation of other communications technical questions, but explain at numerous places quite directly the practical significance of the claims wordings of this protection specification. Section D. provides detailed explanations of the following clarifications.

Firstly: A handover of a communications process takes place between at least two communications networks and/or access points of a network and/or performance features at an access point of a network. The present invention thus not only considers "vertical" handovers, i.e. handovers between different networks, but also handovers between access points or/and performance features of the same network, so-called "horizontal" handovers, and any combination of these two handover types.

Now regarding the terms and their concepts (=meanings=contents=semantics, more precisely: also communications technical pragmatics) of this patent application.

Conceptually (i.e. purely functional, totally abstract)—this is important—
- an abstract "communications process" alias "telecommunications process, TC-process, TCP" takes place between several human and/or non-human "subscribers" (SUBCs) to it who in turn are "users"—or their proxies/part functionalities/supplementary functionalities, such as for example answering machines, mailboxes, MP3-players, IVR systems, typed/hand written/graphic/symbol/speech/ . . . -/DTMF-generators/ DTMF-detectors/interpreters/filters of an active and/or passive kind, in general: "communications applications systems" (see below)—of "terminal systems" (see below) and belong to these, wherein these terminal systems have access to at least one network. Networks/terminal systems/users together accomplish the (abstract) technical implementations of the TCPs.

Thereby:
- a communications process alias a TCP is said to be
  - "potentially", if a concrete measure was indeed carried out for it in at least one TCP terminal system involved in it, but not however in any device of its TCP terminal systems (i.e. only in at least one TCP-SUBC in at least one of these TCP terminal systems, see below)
  - "current" if this has already happened in at least one such terminal device and "started" alias "begun" in each of the two cases,
"retrospectively" alias "ended" if no longer any concrete measure is taking place for it in any of the TCP terminal devices involved with it.

It should be noted that a TCP would thus at the latest be begun/started when in at least one terminal device (e.g. a telephone) of one of its terminal systems at least one measure relating to it was started/begun (e.g. the lifting of the telephone receiver, or the local input/output or also only the local selection of a telephone number of a person to be called through somebody participating in the TCP somehow, or the manual or automatic start of a timer on expiry thereof a call takes place, or . . . )

a current TCP is said to be
"in the connecting state" until a SUBC data exchange has started in it,
"starting to run" as soon as this SUBC data exchange has started, and
"running" as soon as the SUBC information exchange has started,
wherein an "exchange" has started as soon as the exchange of at least one "SUBC data" or one "SUBC information" of a TCP-SUBC has started between at least one TCP terminal system and at least one network currently used by the latter. A SUBC data or SUBC information is thereby a finally/originally SUBC perceivable/possible-to-generate information which was sent out or inputted or selected by means of this terminal system to/from this (non-human or human) SUBC. The difference between the two is that SUBC data are as a rule only exchanged for a possibly required management (=generation, interruption . . . , termination) of a TCP, whilst SUBC information is exchanged for fulfilling the purpose of the TCP, in both cases between its SUBCs or aforementioned proxies/part functionalities/ . . . .

This written specification differentiates between at least two types of communications processes alias telecommunications processes: primary communications processes or primary telecommunications processes (PTCPs) and—belonging to each handover therein respectively—at least one secondary communications process alias secondary telecommunications processes (STCP) alias HOCIS-TCP. Each TCP has its own OSI connection (see below). Both types of TCPs and their terminal systems can however use in their abstract and/or material implementation substantially the same or different abstract/material operating means.

These TCP terms/concepts thereby apply universally, thus also for an handover alias an handover process, if this is a communications process/TCP—then it is a third type of TCP. Whether an handover alias handover process is also a (tele)communications process depends on whether its telecommunications technology implies during an handover a communication between the SUBCs of the PTCP on which the handover is based, or not, which is however irrelevant here: the HOCIS method can be used in both cases—and can in the first case where necessary use the handover TCP and/or consider it as a PTCP, as is apparent for example from the explanations to the last FIG. 5 in section D.

the communications technology terms used in this patent application are defined in the internationally standardised "*ISO 7498-1, Information technology—Open Systems Interconnection—Basic Reference Model: The basic model*", in short: ISO/OSI Reference Model or OSI RM. This forms for the relevant person skilled in the art the binding notional/conceptual basis of this patent application.

For the following use of the OSI terminology/conceptuality and especially for the OSI RM made-up words/terms in this written specification it should be pointed out in advance that the latter
on the one hand cannot recapitulate them completely so that as a substitute reference is made to the above mentioned international standard, wherein in cases of doubt this written specification is the authority, and
on the other hand at some places concretises them regarding the situations in the case of an handover and the associated HOCIS process (see section D.).

As regards terminology/conceptions in the sense of the OSI reference model there is in each "n-point-communications process", n>=2, between any two of its terminal systems, for example A and Z, an abstract "OSI connection"—which extends to the communications application systems in these two terminal systems, as will be explained below.

Each OSI connection is according to the OSI RM basically always sub-divided into at least 7 abstract "Li connections" ($1<=I<=7$) "lying on top of each other", by means of which this communications process takes place between these two terminal systems A and Z (wherein "L" stands for "layer").

The OSI RM thus defines—on the basis of its "7-layers" of always in principle identical "abstraction-semantics" of its Li-connections in each OSI connection—the "OSI communications architecture" which in turn is based on this "7-layers-structure" of the basic abstraction semantic of all the OSI connections. The OSI RM calls each of these basic 7 abstractions layers of its communications architecture—quite independently of individual OSI connections—obviously "Li", $1<=i<=7$.

Several Li connections can exist for each "i" in any one individual OSI connection. Each such Li-connection must use for its implementation at least one Lj connection of the same OSI connection, wherein always j<I holds—apart from
an L7 connection (i.e. i=7) which can use for this another L7 connection, and
an L1 connection, which uses for this as a rule a "physical medium"
wherein an Lk-connection ($1<=k<=7$) can be used by several OSI connections or in one OSI connection by several Lk+i-connections ($1<=i<=7-k$).

An L7-connection of an OSI connection is often called a "communications connection" since in it of sole importance is the "communication" in the sense of the specific telecommunications process on which this OSI connection is based or of the "communications applications systems" supporting it (the latter located in at least the two terminal systems of the OSI connection). I.e.: An L7-connection abstracts entirely from the modalities of the information transfer (=L1 to L4 functionality) used in this communication, —of a communications applications system which where necessary human SUBCs operate in it—information sub-division (=L5-functionality) and information presentation (=L6-functionality): An L7-connection only knows the "interactions" in this "communications application" communication.

An OSI connection of a telecommunications process "exists"
locally not only between its two (telecommunications process) terminal systems A and Z—more precisely:

between these two terminal systems A and Z exists the L3-connection of this OSI connection—but by means of its L7-connection also between the communications applications systems or their SUBCs in these terminal systems A and Z, and temporarily as soon as this telecommunications process has started—more particularly the L7-connection of this OSI connection exists from this moment in time between these two communications application systems or SUBCs of this telecommunications process—and remains existing until these two communications application systems or SUBCs consider this telecommunications process as ended (which the OSI RM models as ending of this L7-connection and OSI connection).

Accordingly this OSI connection—owing to the start of the communication of its communications application system creating it, i.e. the beginning of the telecommunications process—exists at the latest from the moment in time at which some measure for it takes place in a terminal device of the terminal system of the (communications process) SUBC creating it in A or Z. However at this moment in time there need not yet any Li (1<=i<=7) of this OSI connection be (abstractly) implemented or possible to implement. The existence of a Li connection thus does not imply its (abstract) implementation or possibility to be implemented. And more generally: With any OSI connection its at least 7 Li connections also exist, of which however no single Lj connection—and its interaction with the other Li connections of this OSI connection—needs to be abstractly implemented (the OSI RM does not consider material realisations/implementations anyway). An (abstract) implementation of a Li connection needs only to be given during its actual (abstract) use.

This implies that the OSI connection remains in existence between these two terminal systems A and Z for this TCP even if in particular its at least one L3 connection is not or cannot be implemented, as often happens in HOs of their terminal systems.

That in any case the L7 connection of a PTCP OSI connection remains in existence in an handover case can be ensured by means of the HOCIS method according to the invention (see Section A.) since it ensures that at least one PTCP-SUBC in A or Z always knows that this PTCP (i.e. the PTCP OSI connection) has not yet ended, although for example an L3 connection interruption is occurring in it—wherein this SUBC anyway sometimes knows this about this L7-non-termination, also without any HOCIS method, because this non-termination arises for him from his application communication which he executed in the seconds preceding the L3 connection interruption. The HOCIS method confirms in such a case the corresponding SUBC assumptions or corrects them. The latter for example if the SUBC involved directly in the handover ends during the handover—thus during an L3 connection interruption—the OSI/L7 connection (i.e.: the associated PTCP) unilaterally.

It should again be pointed out here that a PTCP OSI connection in the method according to the invention need not connect the same terminal systems as an STCP OSI connection associated with it: In both however the SUBC considered at the time is the same (which section D. emphasises).

abstract "terminal systems" contain in addition to their abstract human users and/or non-human users (=user-automatons) and/or their aforementioned proxies/part functionalities—all to be understood as PTCP-SUBCs—abstract "terminal devices", all of which in one terminal system are occasionally termed below as "terminal device", i.e. non-human functional groups, such as e.g. those of LANs, WLANs, main frame computers, data bases, PBXes, RASes, firewalls, switches of all kinds, but also those of network-accesses, IADs, I/O-devices. Non-human (abstract or material implementations of) functional groups in terminal systems will often be termed "modules" in the following.

abstract individual "terminal devices" of a terminal system can be considered separately from one another, more particularly a "terminal terminal device", always with electronic/physical/acoustic/optical "logical" user interface (which is frequently mobile, e.g. in a mobile telephone)

a "non-terminal terminal device", with or without network-specific "terminal adapter" (TA) for its "network termination" (NT="network terminator"), in any case without one such user interface just outlined, wherein subscriber-terminal and non-terminal terminal devices of a terminal system interact with one another by physical/communications technical interfaces and/or further terminal devices, of which as a rule only some are standardised, and a non-terminal terminal device (and even its terminal adapter and associated network terminator, see section C.) and a terminal terminal device can be integrated in a material implementation—particularly in a mobile terminal device (e.g. a mobile telephone) in which then the former is likewise mobile.

At least one functional module "M(HOCIS)" in a terminal system is implied. This M(HOCIS) is functionally sub-divided further, as explained in detail in section D. in order to make it easier to obtain the precise understanding of the claim 1 wording/meaning. Regarding this sub-dividing of an OSI RM-compliant terminal system into modules (as further explained particularly in section D.) it is pointed out that the OSI RM at first sight avoids sub-dividing terminal systems, but does actually undertake this. The reason for this is the notional necessity for sub-dividing communications applications (such as the abstract HOCIS communications application, which is notionally indispensable for the abstract implementation of the HOCIS method, which as a rule are located on the L7 in the terminal systems) in order to understand them. This necessity led in the definitions for the L7 (in the relevant international standard ISO/IEC 7498 of 1994 and the identical ITU-T recommendation X.200, inter alia page 32/33, and more specifically in the international standard ISO/IEC 9545 of 1994 and the identical ITU-T recommendation X.207) to the definition of the functional structure of an OSI RM-compliant abstract communications application which logically implies the functional sub-division corresponding to it of the terminal systems containing them—namely in their area of the OSI RM-compliant abstract communications application contained by them.

abstract "servers" alias "server terminal systems" alias "terminal systems-without-human telecommunications process subscribers" are functional groups in or on a network—being managed by its network operator(s) or not—which in this written specification are likewise regarded as terminal systems/terminal devices, the latter however not to be subdivided into terminal/non-terminal.

abstract "systems" are either terminal systems/terminal devices or computers integrated anyhow into a network.

the many possible Li relay roles of a server and/or system in a PTCP or STCP OSI connection need not all be explained in detail in this written specification—the discussion of the relay examples in the FIG. 5 provide clarity on this for the relevant person skilled in the art. Particularly important here is a (stationary or mobile) "HOCIS server" and/or a "HOCIS system" in a HOCIS TCP—which belongs to a handover of a PTCP—as a terminal system of at least one of its one or several HOCIS OSI connections (see the explanations on the last FIG. 5 in section D.) which can also be a HOCIS server or a HOCIS system in a network.

a PTCP terminal system (and its PTCP-SUBC) in a handover is called potentially or currently or retrospectively "directly involved" if it undertakes at its network access point (over which the PTCP is routed) during this handover process on the L3 on the one hand a total or partial and on the other hand a permanent or temporary network/network access point/network performance feature-usage feature change potentially or currently or retrospectively and thereby retains its PTCP OSI connection (alias its PTCP). A PTCP terminal system (and its SUBC) is said to be "indirectly involved" in this handover if it is not directly involved in this handover.

this written specification need only to consider the case that there exists in a PTCP at any moment in time only a single handover—thus abstract "one directly involved system"—HOs. Of each PTCP embodiment which gives the impression that it also relates to an abstract "several directly involved systems"—handover—which in practice is reasonable—it can namely easily be shown that it in actuality is based on the handling of a sequence of time-overlapping "one-directly involved system"—HOs, which this patent application deals with. There follows from this:

The above mentioned potential/current/retrospective attributing of a TCP can be applied for an handover/process.

Since the (abstract) implementation of a PTCP OSI connection alias its PTCP comprises n>=2 PTCP systems, n–1 systems are involved indirectly in an handover in this PTCP.

applies for a HOCIS TCP alias STCP associated with an handover of a PTCP that it begins/starts with the discovery of the presence—where and however in at least one of its PTCP and/or associated HOCIS TCP alias STCP systems—of a "signal" alias "HOCIS signal". For an STCP the aforesaid potential/current/retrospective attributing of a TCP with the starting point can likewise be applied.

The starting points of the PTCPs, their HOs and their STCPs in a HOCIS method—unless stated otherwise—are/can be arranged chronologically in any sequence.

A HOCIS TCP alias STCP alias its STCP OSI connection—for a potential or current or retrospective handover of a PTCP—can in particular have something to do with this PTCP insofar as for its (abstract and/or material) implementation, i.e. for the implementation of its STCP OSI connection, thus its STCP Li connections, it can use one or more of the Li connections of the PTCP OSI connection (i.e. its abstract and/or material implementations at their end points in the PTCP systems).

However the implementations of both OSI connections (in the abstract and/or material implementations) can also take place completely independently of one another.

It is thereby only important that the HOCIS method is based on a transfer of handover-relevant information from a HOCIS system (of a certain modality) to a SUBC—however the HOCIS OSI connection which is essential therefor is implemented. This is also not conflicted with the start of the HOCIS/STPCP of this OSI connection being carried out through the presence of a (HOCIS) signal in a PTCP and/or HOCIS secondary system.

It should furthermore be noted that the type of accomplishment/occurrence/presence of such a (HOCIS) signal in at least one of these systems is in no way restricted, it must not be confused with the accomplishment/occurrence/presence of any handover-relevant information and it need not be explained in detail in this written specification.

the HOCIS method respectively considered—more precisely: a HOCIS TCP considered as its abstract execution instantiation—is clearly assigned to an handover of a PTCP.

an STCP in no way implies a current handover: it belongs for example to a potential handover.

an STCP (for a potential or current or retrospective handover of a PTCP) implies that an attempt was started at least once to transfer handover-relevant information supplied by at least one M(HOCIS) to a SUBC of this PTCP.

This "attempt at transfer" means (see FIG. 5 and their explanations)

either a transmission/receiving attempt of handover-relevant information over/from at least one network through an M(HOCIS) in at least one PTCP/STCP system and/or the attempt of its local transfer/acceptance to/by its SUBC, or the M(HOCIS) of the terminal device of this SUBC has generated locally—by a protocol previously agreed between these two M(HOCIS)s, possibly on the basis of a "time out"—mechanism as is/are known to the person skilled in the art—such information without this having been sent and/or received over a network.

This is the "core" of the present invention on which the claim 1 wording/meaning is based—which will be explained again and in more detail below (particularly in section D.).

an "handover-relevant information" is an ultimately SUBC-perceptible information at least about the terminal system directly involved in the handover and which is transferred in a terminal STPC/PTCP terminal system to its PTCP-SUBC, after it was detected and supplied and transferred for this by means of an M(HOCIS).

It ultimately corresponds to the "handover convenience information support suitability" of the HOCIS method regarding a PTCP-SUBC who is involved in an handover (and is as a rule human in the examples of this patent application). It is ultimately designed/articulated/coded/presented/located for/on the abstraction level of its "automated" and/or physical and/or syntactical and/or semantic and/or pragmatic/mental perceptibility:

An handover-relevant information is conceived pragmatically/mentally/psychically in regard to the concern to provide a HOCIS for SUBCs of particularly those PTCPs in which at least one PTCP-SUBC is mobile (for just that reason in future HOs ought to appear often) namely in such a way that it is as a rule perceived as welcome by the SUBCs. It can indeed—if this is appropriate for some reason for these SUBCs—contain network and fees-information with the appearance of elementary telecommunications events in the current PTCP, but must however not be restricted to such "pragmatic/mental/psycho trivialities". Rather a HOCIS must "ingratiate itself into the heart of these SUBCs" and must supply these SUBCs as regards their PTCP and its HOs with confidently/pleasurable information—as flexible, sensitive and individual as possible. It should be noted that a HOCIS for example can completely relieve the SUBC of permanently and repeatedly checking into the WLANs which he passes through short term one after the other, and informs him where applicable only about a network change if this was for example defined by him. The relevant person skilled in the art can as a rule distinguish from an handover-relevant information transferred to a SUBC—immediately from a more complex HOCIS—whether it is according to the invention or belongs to the above trivial area which the relevant prior art has also already rudimentary developed.

An handover-relevant information, such as is generally standard for information, is shown semantically/syntactically in perhaps a presentation/coding of a human natural language and/or writing and/or symbols and/or . . . . However this does not rule out any other type of information display in it, such as telecommunications-conventional syntactic codings, possibly in the form of internationally standardised PDUs, known to the person skilled in the art, for example "ASN.1-PDUs", and their semantic assignments of any kind.

This implies configuration/display variants of an handover-relevant information
on the one hand as "SUBC-adequate HOCIS which is based on at least one "HOCIS-SDU" (SDU=Service Data Unit). SDUs are thereby to be distinguished from their material implementation by means of at least one "HOCIS-IDU" (=Interface Data Unit) which this written specification does not consider and
on the other hand as telecommunications-adequate at least one "HOCIS-PDU" (PDU=Protocol Data Unit).

This written specification simplifies this OSI terminology insofar as it likewise regards the SDUs as PDUs. Consequently an handover-relevant information is in this patent application always a HOCIS-PDU understood in this way.

In order to simplify the illustration of that which has been mentioned above regarding the OSI RM it should now be explained:
With regard to a PTCP/STCP-SUBC the abstract term "handover-relevant information" contains the aforementioned at least one HOCIS-SDU which is transferred to this SUBC by means of at least one OSI RM type "HOCIS Service Element" which provides this SDU, wherein
these abstract "HOCIS SEs" as a rule specify the possible material implementations of the HOCIS measures for this SUBC as regards an handover.

I.e.: In the following the terms "handover-relevant information", "HOCIS" and "HOCIS service" are ultimately synonyms insofar as they model the ultimate material information of a material SUBC of a (current or potential or retrospective) material PTCP as regards one of its (current or potential or retrospective) material HOs in an OSI RM-conforming way.

a HOCIS TCP obtains its HOCIS of a PTCP-SUBC as regards an handover (and thus also affects where applicable the triggering or modification or suppression of this handover or of a report thereon) without modification of one of the networks required for the PTCP/handover implementation. The latter need not even learn anything about a claim-1-type HOCIS TCP for a PTCP, since the former as a rule is located on the L4-L7 of its underlying STCP OSI connections—even if its handover-relevant information refers to L1/L2 conditions in "its" PTCP OSI connections. An STCP is thus completely "network transparent" and can thus also be materially implemented.

a user of a terminal system/device can
possibly by himself determine/reduce/switch off—in short: "configure"—the display of a HOCIS offered to him and/or the modalities of his acceptance of a HOCIS namely for the time before and/or during and/or after the execution of the actual handover,
exchange HOCISSs with any other processes/applications and
have to confirm or not confirm in at least one way the acceptance of at least one HOCIS, wherein such a confirmation/non-confirmation can or can not change the course of the HOCIS TCP.

must be differentiated as regards the relationship between a terminal system and a network between the rudimentary connectivity of this terminal system to this network, as well as its internet connectivity and its communications application connectivity over this network:

Its
"rudimentary connectivity" to a network is given as soon as it can receive on the L1 and L2 at least one PDU from this network (it has then already carried out a "rudimentary handover" to this network)
"internet connectivity" over it is given as soon as it can use thereby connections to other internet terminal systems—which in addition to its L1/L2 connectivity also requires its "admin connectivity" to this network, i.e. that it is "checked in" at this network (see the explanations of the last FIG. 5 in section D.)—and
"HOCIS connectivity" alias "special applications internet connectivity" over it is given as soon as it can use thereby connections to other internet terminal systems wherein these internet connections have to be routed over this special communications application system.

This patent application—unless stated to the contrary—differentiates only between this rudimentary connectivity just described and the HOCIS connectivity so that the latter also comprises special applications internet connectivities, more particularly "netsurfing internet connectivity" alias "WLANsurfing internet connectivity".

A terminal system which is connected only rudimentarily to a network must—if it wants to use this network in order to implement its internet connectivity by same—carry out directly involved an handover between the service features of this network: It must change over in this handover between the service features "L1+L2 service" and "L1+L2+L3 service" of this network used by it.

The difference is also to be noted which there is between a rudimentary handover of a terminal system to a network compared to the checking in of this terminal system into this network: The former is a necessary telecommunications measure of this terminal system as regards this network so that this terminal system can then carry out its check-in at this network. The check-in of a terminal system into a network thereby needs to imply not yet a more extensive possibility of usage of this network through this terminal system, particularly no internet connectivity of this terminal system—of which the relevant person skilled in the art is fully aware.

In the HOCIS method special importance is placed on the discovery of the rudimentary connectivity of a terminal system to a network: It implements its starting time point.

there is also a need to explain the terms

"paired" of STCP/PTCP systems: This attribute/feature of at least two STCP or PTCP systems means that they communicate with one another in an STCP or a PTCP. At this point it should be reminded that in one embodiment alias material implementation of the HOCIS method, a system can contain both at least one STCP and one PTCP system—which changes nothing to the fact that abstractly an STCP or PTCP system in each case only operates with a paired system the STCP and PTCP OSI connection corresponding to this TCP.

"active communications attempt" of an STCP/PTCP system: This term designates an attempt by this system to send over at least one network at least one PDU to a paired system and/or to receive some sort of confirmation for its receipt.

The fundamental novelty in the HOCIS method described basically in many words in section B. will be repeated below with few words and practice-orientated: The HOCIS method supports, as regards a—potential or current or earlier—handover of a terminal system of a PTCP, at least one PTCP-SUBC through at least one HOCIS alias one HOCIS measure. It is started by the discovery of the presence of at least one HOCIS signal in at least one PTCP or STCP terminal system. As a result of this an handover-relevant information relating to this is transferred to at least one PTCP-SUBC (either after its STCP terminal system received this over a network or as a substitute it construed itself). This SUBC receives this HOCIS however not because he had requested it but because he was to experience as little negative interference as possible by this handover. The HOCIS method is thus "socially" founded.

The HOCIS method thus endows PTCP terminal systems with a behaviour which as regards its potential and/or current or retrospective handover was up until now never once thought of. More precisely: It imparts to PTCP terminal systems/devices as regards HOs—in order to support their SUBCs—a completely novel type of "social behaviour" in respect of these SUBCs: Up until now there was never any trace of such an idea.

For just that reason it differs fundamentally from the present state of the handover art (see section A.): it is namely totally unaware of the "interpersonal" handover problem—that namely with an handover at least one subscriber of a PTCP indirectly involved therein is left in the dark about this handover and its continuation at least temporarily and thus becomes possibly considerably irritated, let alone that there would be some reaction possible to it for him. It not even regards its total "neglect of user interests regarding HOs" as a problem.

The HOCIS method is the technical core of a solution to this actual problem: this written specification thus reveals a basic principle of a technology by means of which any PTCP-SUBC (according to his needs) can be informed about/supported by a (potential or current or earlier) handover in this PTCP—thus also a SUBC not directly involved in an handover.

The HOCIS method is also suitable to support subscribers with seamless MIHs. An example for the meaningful purpose of such support: When downloading a large data file by WLAN technology onto a PDA its user moves out of the WLAN used for this. Is a MIH method to engage here and let the download continue over a more expensive and/or significantly slower GSM network or should it be continued only with the availability of another WLAN, or is it now to possibly be totally broken off? To want to not inform the user about these alternatives—as is provided with seamless MIH—must by-pass market needs.

Whereas it is strikingly obvious that the HOCIS method according to the invention is reasonable in an handover between a WLAN/Femtocell and mobile network, this can also apply with all other networks/part networks/network types which are all covered by the claims wording/meaning, particularly "HOs with mobile network/mobile network roaming"—even if the examples/figures in this written specification only concretise the first-mentioned case.

The HOCIS method is a fundamental further development of the known support of a user during his work with his real or virtual local application system, possibly MS Word or MS Explorer or also the navigation system of his car. It is a fundamental further development of this support because a user during this work up until now is supported only as regards determinants of his current actions, which reflect his sphere of influence which is known to him and does not change automatically, whilst the HOCIS method supports him in a novel way additionally as regards novel determinants of his actual actions which reflect an area unknown to him and changing automatically from his viewpoint and impossible to be influenced by him (here: as regards events of all kind which are handover-relevant there). The fundamental innovation of the HOCIS method thus consists in its novel "convenience information support" of the subscribers of a primary telecommunications process as regards their novel determinants of their actual actions in handovers within that telecommunications process.

To conclude this section B. the following should be noted. In the descriptions up until now of the HOCIS method its support of a PTCP-SUBC or his FMC telephone indirectly involved in an handover is in the foreground, and this also applies for most of the following sections of this written specification. Since the section B. inter alia should make the essence of the HOCIS method clear, it is now expressly pointed out and substantiated briefly that and why it can also support a PTCP-SUBC directly involved in an handover—namely in the generally known practical example of an FMC telephone and its discovery of its rudimentary IAD connectivity.

The HOCIS in this special application example of the method according to the invention (for a PTCP-SUBC=FMC telephone user directly involved in an handover) demonstrates the market relevance of the HOCIS method by in particular explaining its practical FMC usage simplification potential. An "handover convenience information support" of this type namely differs clearly—after the FMC telephone has established its rudimentary IAD connectivity (see above)—from the nowadays known user information through the telephone about this event wherein this information for the user becomes available only as a result of non-trivial user activity on the telephone, and the execution of the latter stops any other user activity on the telephone, and both do not support the user as regards his evaluation/forcing/acceptance/questioning possibility/avoidance possibility/ . . . of this potential handover, whilst the future user-HOCIS, quite differently from this meagre user information, requires no user activity on the telephone and/or prevents no user activity thereon and can support him very substantially particularly as regards an handover—for example by facilitating a "one touch handover" to this IAD (by checking this rudimentary connected IAD immediately, automatically and in the background: whether: the user could where necessary check into it and even use it also then for a specific purpose, possibly for the above mentioned "netsurfing")—so that the user can then use this one-touch handover in order to establish from the rudimentary IAD connectivity of its FMC telephone its internet connectivity (via this IAD) or even its netsurfing internet connectivity (additionally via his home-IAD).

A one-touch handover of this kind (implemented by HOCIS method) or even zero-touch handover or another (such as possibly configured by the telephone user for this handover) causes the use of an FMC telephone to be much more convenient and as a rule additionally more cost-effective than this is possible without the HOCIS method—so that it is also regarded as welcome by this PTCP-SUBC directly involved in an handover.

Thereby this HOCIS (for example by one-touch handover) can seamlessly complete for a user of a telephone directly involved in an handover the HOCIS explained further above for a PTCP-SUBC indirectly involved in the same handover. The sub-section D., more particularly D.4.9. and the associated FIG. 5, more particularly the explanations of FIGS. 5o-r provide further understanding in this respect.

DETAILED DESCRIPTION OF THE INVENTION

Figure 1:
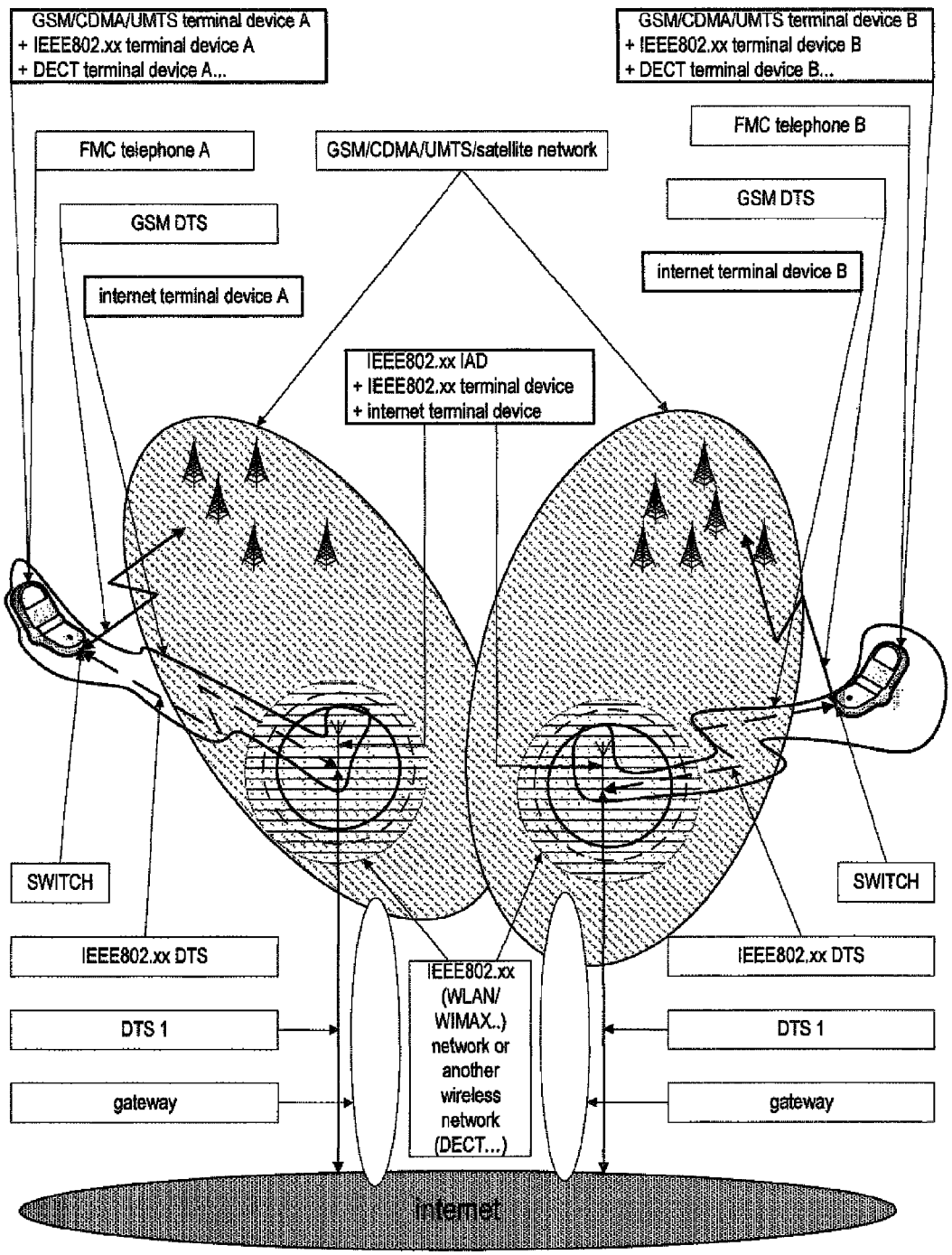
FIG. 1 is a diagram showing a handover arrangement between a mobile network and an IEEE802.xx wireless network and associated integrated access device with access to the internet, as well as an FMC telephone with regionally unrestricted/restricted access to both networks in accordance with a first embodiment of the invention.
Figure 2:
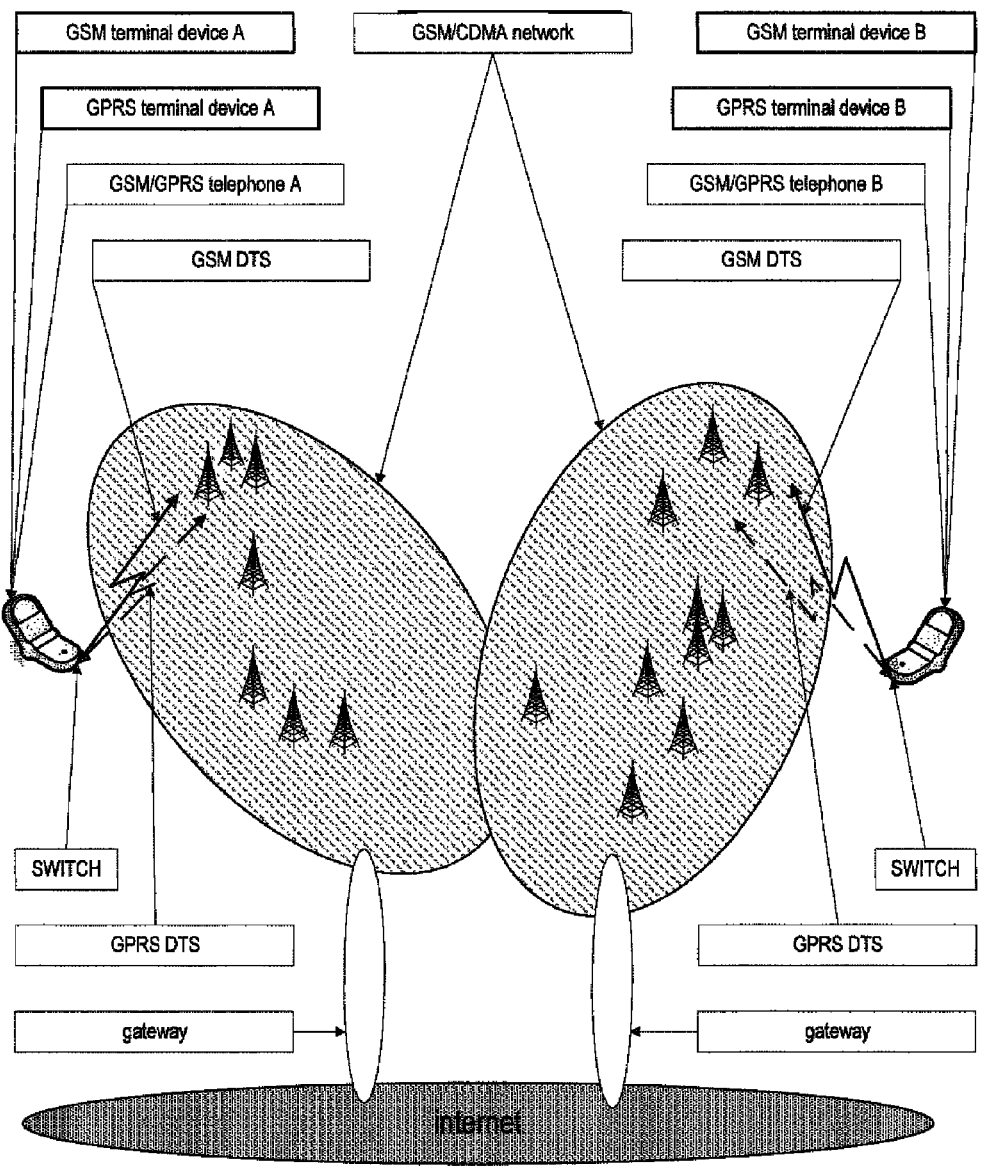
FIG. 2 is a diagram showing a handover telecommunications arrangement for GSM/GPRS telephones in accordance with another embodiment of the invention.

C. Embodiment Variations of the HOCIS Method—and Explanation of Further Associated Communications Technology Terms/Concepts The HOCIS method outlined in this section C. and the associated FIGS. 1 and 2 are restricted to considering the HOCIS method in telephone calls while including mobile terminal devices, i.e. in particular to HOs in two party PTCPs in (practically) real time by using at least one mobile and/or wireless network. These special cases cover no "asynchronous" PTCPs in which their SUBCs need not have to participate at the same time, such as email-based PTCPs, and no HOs with the participation of at least one fixed line network, and they touch only HOs within a wireless network (possibly by including "Femtocells" or WiFi-WLANs and similar constructs in a GSM/CDMA/UMTS/Wimax/ . . . -network)—naturally without thereby removing the associated non-considered HOCIS method special cases from the protection area according to the claims wording/meaning.

These outlines are thus only to explain some of the anticipated frequent "mobility-conditioned" HOs in telecommunications arrangements in which the HOCIS method can be helpful. They are to show in particular that its implementation—by means of at least one non-human module—can be located completely or partially especially in:

1. mobile network or at least wireless telephones 2. mobile or stationary integrated access devices (IADs) of a WLAN, whose forerunners were technically simpler and were called "Access Points", (APs), wherein the WLAN of the IAD can also be a "Femtocell" of a GSM/CDMA/UMTS/Wimax/network)

3. systems/servers/IADs in or at a communications network, possibly for each SUBC of a PTCP elsewhere.

Since in the following discussion the term "access" to a communications network of a terminal system of this network is of crucial importance, its meaning—which is known to the relevant person skilled in the art—will first be explained (to an extent adequate for this specification): Its thus constructed definition according to a person skilled in the art reads: An (abstract) terminal system of a network (which is thus checked in with it, see above) has at a point in time "access" to this network if it at this time in point can carry out L3-data transmission to the OSI layers L1-L3 of its connection with at least one (abstract) access point of this network or even at least one (abstract) terminal system of this network over this network.

It follows in particular from this that a terminal system of a network does not need to have permanent access to the latter—as is often the case with terminal systems of mobile networks as is known.

The "access point" to this network (particularly in the case of its potential or actual use for a data transmission in/from this network) is thereby the point of transfer (from the operator of this network to those responsible for this terminal system/terminal device) of the legal/commercial and where applicable technical responsibility for the operational capability of the layers L1-L3 on the at least one "data transmission section" (DTS) between terminal system/terminal device and network. The network-side (abstract) terminating device of a DTS at the access point is called "network terminator" (NT), the user-side (abstract) terminating device of this DTS at the access point is called "terminal adapter", TA. In a material implementation of a network access point these two (abstract) functional units, network terminator (NT) and terminal adapter (TA), can be as far as possible integrated—as is the case generally with mobile telephones.

After clarifying the two terms network access and network access point it is also clear that a mobile (abstract) terminal system/terminal device which can be directly involved in an handover, nowadays more particularly an (abstract) mobile telephone, can contain for example one terminal and three non-terminal (abstract) terminal devices:

Its terminal terminal device serves by definition primarily for the (abstract) implementation of the (abstract) acoustic/optical/mechanical user interface of a TCP, and its as a rule three (abstract) non-terminal terminal devices serve for interacting with the at least two different mobile networks/access points/performance features in an handover—wherein the latter may differ slightly from one another in the area of the "Femtocell" variants. These three non-terminal terminal devices are on the one hand the (abstract) "switch" for the (abstract) data switching between its terminal devices—which can be marginalised where applicable, e.g. when using Femtocell technology, because with this there is as a rule no need for a switching functionality—and on the other hand two TAs/NTs to/for the respective network/access point/performance feature (where applicable only one TA/NT with Femtocell technology).

If this capacity of a telephone for the "direct handover" relates to a GSM/CDMA/UMTS/satellite/Wimax/ . . . -network on the one hand and an internet-connected WiFi or Femtocell-WLAN on the other hand then it is occasionally called "FMC telephone" (FMC=Fixed/Mobile Convergence): It then supports indeed the convergence of the usability both of the landline technology of the internet and the mobile network technology of the GSM/CDMA/UMTS/satellite/Wimax/ . . . networks, here when telephoning.

FIG. 1 shows this by way of example by means of an abstract FMC telephone (sub-section C.0. explains the significance of its graphic symbols), which on the one hand has temporary access to the GSM mobile network by the GSM-TN-NT—it is integrated in the FMC telephone—(wherein the GSM DTS between the next stationary antenna of the GSM network and the GSM-NT in the mobile FMC telephone, colloquially speaking: the "GSM air interface", belongs to the GSM network), and on the other hand by the IEEE802.xx-TA/NT—it is likewise integrated in the FMC telephone—has temporary access additionally to a WLAN (wherein the temporary IEEE802.xx DTS between the IEEE802.xx-IAD and the IEEE802.xx-NT in the FMC telephone, colloquially speaking: the "WLAN air interface", belongs to the WLAN), which in turn has by its "aDSL-modem"-TA access to the internet landline (i.e. to its "aDSL-Splitter"-NT and telephone copper twisted pair line-/aDSL-DTS).

It should be noted that the IAD contains at its air interface-side (=not internet-side) a "switch" (just like the FMC-telephone at its air interface side): As can be seen from FIG. 1 the data transmission (for one and the same communications process) can take place between the FMC telephone and IAD on the one hand by its WLAN-NT (and the packet-switching WLAN) and on the other hand by the GSM-NT (and the line-switching GSM network).

A GSM-/CDMA/UMTS feature can be seen from the above: With these networks all the base stations—conditioned technically/in regard to copyright/financially, since they are operators of large cells—have to be under the legal and commercial responsibility of large operators and are thus slow to introduce innovations into the practice. On the other hand IEEE802.xx-IADs/-APs are under the legal and commercial responsibility of their respective much smaller operators so that they offer a technical platform on which innovations of all kinds such as those of this written specification can be brought into use at short notice.

Furthermore an FMC telephone—as shown in FIG. 2 (see sub section C.0.)—can get by with only one TA/NT, by way of example a common GSM-/GPRS-TA/NT for both the line switching and packet switching GSM networks, so that it is thereby possible to completely dispense with an IEEE802.xx-IAD. However, it is possible here in one communications process to switch between the use on the one hand of solely an as a rule more expensive line-switching L3-connection and an on the other hand at least partly slightly cheaper packet-switching L3-connection. Such a changeover is not a network-handover but a performance feature-handover (see Section B.).

By the way the terminal device of the subscriber directly involved in an handover is depicted on the left in the following figures. The illustration on the right, too, is a reminder that the HOCIS method is provided particularly for subscribers of a communications process who are only indirectly involved in this handover.

C.0. Explanations on FIGS. 1 and 2

In FIG. 1 unidirectional arrows belong to the identifiers in the rectangles at their arrows ends, bi-directional arrows stand for data transmission sections (DTSs), the two inclined ellipses each represent a line-switching wide area network (e.g. GSM/CDMA/UMTS/satellite/ . . . , here also called "Network-I."), and embedded therein each an IEEE802.xx-WLAN ("Network-II.") with its IEEE802.xx-IAD/AP, which as a rule has permanent access to the internet ("Network-III."). The area of sufficient signal strength of an IAD/AP is indicated by the solid circle, the chain-dotted/dotted circles concentric therewith signify the falling or fading signal strengths.

Network-II. has no significance on the costs of a primary communications process between A and B, but rather Network-I. and Network III. so that these are also relevant for HOs. In view of this the complete handover terminal device in the primary communications process between the subscribers A and B consists as regards Network-I. of the FMC telephone alone and Network III. of the FMC telephone together with its IEEE802.xx-IAD, wherein the FMC telephone has permanent access to Network-I. and the IAD to Network-III.

If one starts from network III., then the complete handover terminal device is thus the IAD+FMC telephone.

If one starts from the FMC telephone, then it is a complete handover terminal system as regards Network I. and Network II., but as regards Network III. is only part of the previously mentioned handover terminal device.

If one starts from the primary communications process, then it is possible to regard as the complete handover terminal device both the FMC telephone alone and also the FMC telephone+IAD.

In FIG. 2 the complete handover terminal device consists as regards both performance features (of the single network)

both regarding the performance feature "line switching" and also regarding the performance feature "packet switching"

solely of the GSM telephone.

C.1. Example of Use of the HOCIS Method Alone in the FMC Telephone

In FIG. 1 both sides show:
  I. a mobile network (here on the GSM basis) and
  II. an IEEE802.xx wireless network ("xx" e.g. ="11" for WLAN or ="16" for WIMAX) and associated IEEE802.xx-IAD
  III. with access to the internet,
as well as an FMC telephone with regionally unrestricted/restricted access to the Network I./Network II.

In the initial phase of the market introduction of the FMC technology FIG. 1 should be a frequently appearing handover-relevant telecommunications arrangement. In the following handover-situations A) to H) outlined by way of example the left FMC telephone can be involved directly (or indirectly, which is not elaborated on further here) in a current or potential handover:

A) The A-user is located both in a I.-cell and in a II.-cell and quits the latter, although he is just telephoning from it with the B-user.
B) The A-user is located both in a I.-cell and in a II.-cell and quits the latter although he is just calling the B-user from it, this "call set-up" procedure however has not yet concluded.
C) The A-user is located both in a I.-cell and also in a II.-cell and comes into its limit range whilst he is just telephoning from it with the B-user.
D) The A-user is located both in a I.-cell and in a II.-cell and comes into its limit range whilst he is just calling the B-user from it (thus this "call set-up" procedure has not yet concluded).
E) The A-user is located in a I.-cell and enters into a II.-cell whilst he just is telephoning from it with the B-user.
F) The A-user is located in a I.-cell and enters into a II.-cell whilst he is just calling the B-user from it (thus this "call set-up" procedure is not yet concluded).
G) The A-user is located in a I.-cell and enters into the limit range of a II.-cell whilst he is just telephoning from it with the B-user.
H) The A-user is located in a I.-cell and enters into the limit range of a II.-cell whilst he is just calling the B-user from it (thus this "call set-up" procedure is not yet concluded).

The HOCIS method according to the invention can start/start running/terminate in an obvious number of further potential or current handover situations. It is also not exemplified how a subscriber information/support takes place.

In section C.1. solely the FMC telephone A—possibly with support through the telephone B—is entrusted with the execution of the HOCIS method according to the invention. This has the result that the "internet connectivity" between the FMC telephones A and B breaks off for its execution as soon as A quits the reception area of his WLAN.

The handover telecommunications arrangement of FIG. 2 differs in two ways from the previous handover telecommunications arrangement: it permits on the one hand mainly only a performance feature handover but no network handover but on the other hand however such an handover to all "only-GSM/GPRS" telephones.

C.2. Example of Use of the HOCIS Method Solely in the Stationary IAD

Here again we start from the handover telecommunications arrangement in FIG. 1. In all handover processes—of which for example 8 were already outlined in A)-H)—the execution of the HOCIS method according to the invention now however takes place in the stationary IEEE802.xx-IAD of the FMC telephone A. The "internet-connectivity" time interval of this IAD with the FMC telephone B for executing the HOCIS method is larger than the "internet connectivity" time interval provided for this in sub-section C.1.—which compared to this enables an improvement in the HOCIS of the B-user as regards an handover of the A-user.

For example in the above case A) the IEEE802.xx-IAD A would be able to provide its L3-connection to the FMC telephone B over the internet to the HOIS method during this telephone conversation so that it can inform the B-user via this that the A-side IEEE802.xx-connectivity has ended. And further: In several of the above cases the IEEE802.xx-IAD A can enable in all critical phases of potential and/or actual HOs of the telephone call/conversation HOCISs thereby to both communications partners—particularly thus the communications partner B only indirectly involved in the handover of A, who otherwise knows nothing of the technical handover-danger/necessity of the handover of A. An IAD directly involved in an handover can thereby start significantly earlier with the HOCIS method and/or work longer thereon than is possible/advisable for a terminal terminal device directly involved therein.

C.3. Example of Use of the HOCIS Method Solely in the Internet Server

The FMC telephones and their IADs/APs can be arranged exactly as seen in FIG. 1—the latter would here be expanded only by a server at the internet—so that no further figure is necessary.

The great importance of using this telecommunications configuration for implementing the HOCIS method arises from the fact that most of the present day millions of already installed IEEE802.xx-IADs/APs and their IEEE802.xx-/GSM-/CDMA-/ . . . telephones themselves—as a result of their technical inadequacies—cannot perform any HOCIS functionalities, but a suitably designed "HOCIS internet server" (e.g. a suitable HOCIS expansion of a SIP or announcement or . . . server already used in control operation) can act very well for them, by observing the quality of their relevant connectivity as regards an handover and providing by means of this handover-relevant information, which it supplies instead of and by the telephones, HOCIS services derivable therefrom for their users.

C.4. Example of Mixed Design Use of the HOCIS Method According to the Invention

As can be easily seen, the qualities of the HOCIS functionalities of the method according to the invention can be improved in detail in many respects if use can be made of all 3 previously outlined abstract "design variations of a HOCIS service". The method-1-claim wording takes into account this "mixed design advantage aspect": Its wording/meaning is independent of all "functional distribution aspects" in all three types of processes (see section B.) of the HOCIS method.

The HOCIS method is also not restricted in its interaction with any other service—by whomever this is offered and/or provided, possibly with a MIH service. In order to explain such functional distribution and cooperation possibilities there is now an example:

A GSM network operator could reserve for WLAN calls from FMC telephones on his GSM network a kind of (attractively tariffed) "stand-by" connections in his own GSM network, on which such a WLAN call can carry out at any time and delay-free a "local GSM fallback" (for the L3-connection between FMC telephone and its IAD) or a "global GSM fallback" (for the L3-connection between FMC telephone and the second telephone apparatus)—provided the mobile network operator was in a position to cost-effectively solve the problems involved with such a "pre-handover-service". Only its interaction with a HOCIS method according to the invention would make it in effect user-friendly and thus attractive on the market. Such a GSM fallback (alias handover) of a telephone conversation would namely in no way guarantee the desired quality of the "service continuity" without the user-friendly-enhancing HOCIS method:

Particularly not when a global GSM fallback is carried out and the subscriber "non-directly" involved in this handover would only implicitly find out about it, because the current telephone connection unexpectedly breaks down, then his telephone rings again and after accepting the call he unexpectedly discovers that he can now carry on the just interrupted communications process—if he even realises the network change for the communications process and does not regard the interruption simply as a disturbance.

Also the subscriber directly involved therein can be left at least partly in the dark about the progress of the GSM fallback: He knows nothing about whether—after it was triggered in some way from his side—the GSM fallback of the communications process actually took place successfully insofar as no other GSM call had "meanwhile come in" at the communication partner.

And both subscribers can be additionally confused if the GSM fallback—despite the pre-handover-service rendition of the mobile network operator—for some reason slowed down anyway because the network technology if anything in the meantime briefly "is petulant".

This example shows that—in order to obtain high quality of the service continuity in an handover—even a "seamless MIH" in many cases will require the support through a user-friendly HOCIS-method whereby this concrete implementation is in no way limited as regards content, functional distribution and cooperation with other services.

C.5. Re User Control of the HOCIS Method

Whereas in the previous sections on HOCISs the aspect of their contextual user-information in real time in an handover was at the forefront, it should now briefly be reminded that the HOCIS method also enables the configuration of important other aspects: It allows at least one user in a HOCIS process the capacity by means of his HOCIS at any time:

To call up different current status information for at least one handover and/or the HOCIS process associated with it and its past and possibly future (as with user interfaces of vehicle or aircraft navigation systems).

To input different current instructions for continuing at least one handover and/or the HOCIS process associated with it.

To input different current instructions for selecting the functionality available to him and/or for local display of these HOCISs on his terminal device.

Some examples for the functionalities of the HOCISs mentioned here and which can be determined by the user and their local—even temporary—display were/are mentioned at several places in this written specification.

According to this the contents details of these functionalities and their local displays are not the subject of this written specification. Its claims deal only with the basic fact of such functionalities of the HOCIS method according to the invention, i.e. the "social" functional reaction extensively shown in section B. of a terminal system/device directly involved in an handover (with the presence of a HOCIS signal in one of the terminal devices of a communications process), but not however impose any restriction on the configuration as regards content and illustration.

C.6. More on the Modelling of the HOCIS Method/Apparatus According to the Invention The principles of the OSI RM-based modelling of the abstract HOCIS method/apparatus according to the invention were discussed in section B. The application of these principles leads in this patent application to abstract HOCIS method systems and abstract HOCIS apparatus systems which are called uniformly in Section B. HOCIS systems (alias STCP systems). According to the OSI RM both types of HOCIS systems contain abstract functional components (=functional groups) which it names "entities". It considers these entities alias functional components only insofar as they are relevant for the abstract realization of OSI connections of communications applications and their services.

The communications application at hand here is according to the invention split in two parts and consists of the HOCIS method and the HOCIS apparatus—therefore the two aforementioned types of HOCIS systems. Their aforementioned entities alias functional components are unavoidably found again in a material implementation (=embodiment) of the HOCIS method or HOCIS apparatus in the software and/or hardware components of this embodiment.

Accordingly this written specification in particular considers its abstract HOCIS apparatus—it calls it also "STCP apparatus", see claim 80—as consisting of abstract HW/SW functional components, wherein this association of a functional HOCIS apparatus component with the HW/SW is completely irrelevant. It is only important that the abstract implementation of the functional components of an abstract HOCIS apparatus can take place by means of independent functional HOCIS apparatus HW/SW components or functionally similar and/or functionally suitable PTCP HW/SW components or functionally similar and/or functionally suitable HW/SW components of quite different TCPs and/or systems (possibly of at least one operating system and functional HW components managed by the latter).

Apart from the first case an "abstract HW/SW resource sharing" takes place between the HOCIS apparatus components and functional components of the other systems mentioned. This abstract HW/SW resource sharing can be found again or not in a material implementation alias embodiment of this HOCIS apparatus and in the first case is called "material HW/SW resource sharing".

I.e.: An abstract implementation of such a HOCIS apparatus in its functional HOCIS apparatus terminal systems at PTCP-SUBCs to which HOCIS is to be granted, can co-use there each time functionally similar or functionally suitable HW/SW components of a PTCP and/or operating system (and functional HW components managed by same) of the SUBC per abstract resource sharing.

Conversely: An abstract implementation of a HOCIS apparatus terminal system of a SUBC requires in some circumstances no independent abstract HW expansion at all of its at least one PTCP terminal system since the abstract HW components of the latter are sufficient for this abstract implementation by means of "abstract HW resource sharing". This can then also apply for a material implementation of this HOCIS apparatus terminal system by means of this material PTCP terminal system. This is however not a necessary feature of an embodiment alias material implementation of a HOCIS apparatus terminal system so that it could embody claim 80.

Figure 4:
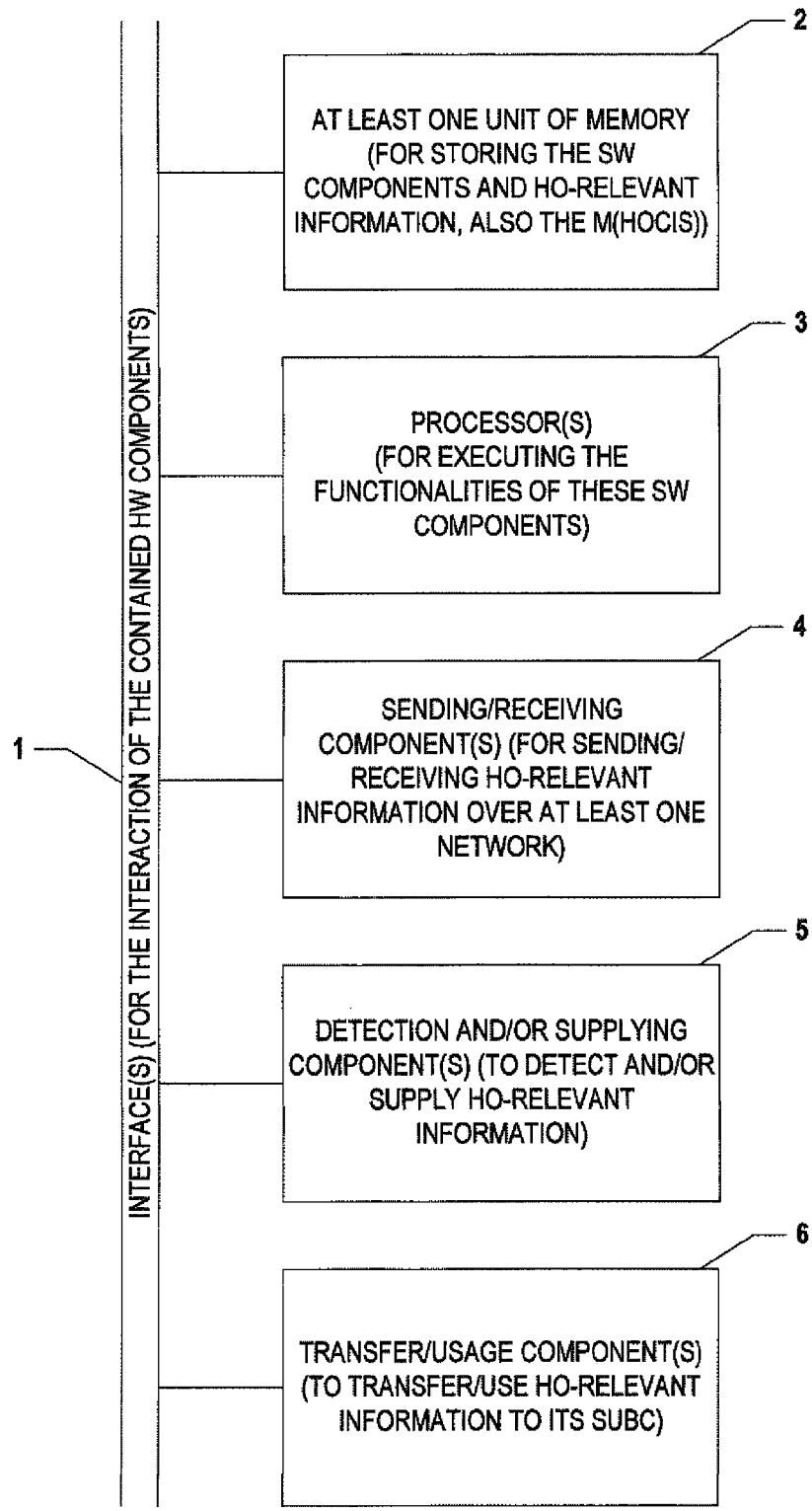
FIG. 4 is a block diagram of hardware/software components of a system for carrying out the present invention.

An abstract HOCIS apparatus terminal system—the HOCIS method main claim is only concerned with certain functional HOCIS SW components which it regards as executable and calls collectively M(HOCIS)—contains the following abstract HW/SW components (see FIG. 4), which serve to implement the means in the claims 80-91:

at least one memory (2) for storing its SW components and handover-relevant information, also the M(HOCIS), at least one processor (3) for executing the functionalities of these SW components, at least one sending/receiving component (4) of handover-relevant information over at least one network, at least one detection and/or supplying component (5) of handover-relevant information, at least one transfer/usage component (6) of handover-relevant information to/for its SUBC, at least one interface (1) for the interaction of these HW components, if contained.

This written specification is currently primarily directed at embodiments of the HOCIS method/apparatus which are embodied completely by means of the material PTCP terminal systems and/or material PTCP servers/IADs which exist in any case at a PTCP-SUBC, in that additionally at least one HOCIS module was located each time thereon (which makes special material PTCP and STCP systems out of them). Its protection range is however not restricted to such embodiments, but it comprises—according to the claims wordings/meanings 1-91—also a number of embodiments of the HOCIS method/apparatus which these above-mentioned material PTCP systems of a SUBC supplement for example each time by at least one additional material HW device.

The above discussion about a modelling of the abstract HW/SW components of HOCIS systems—essentially sublimated in section D. —serves only for the elementary clarification of the purely functional type of the HOCIS features (according to the claims wording/meaning) from the implementation of which through a concrete HOCIS embodiment it is to be decided whether the latter encroaches upon the protection area of this written specification or not.

C.7. A Non-Human Module Design as HOCIS-ISR Server (ISR=Interactive Signal Response)

Figure 5A:
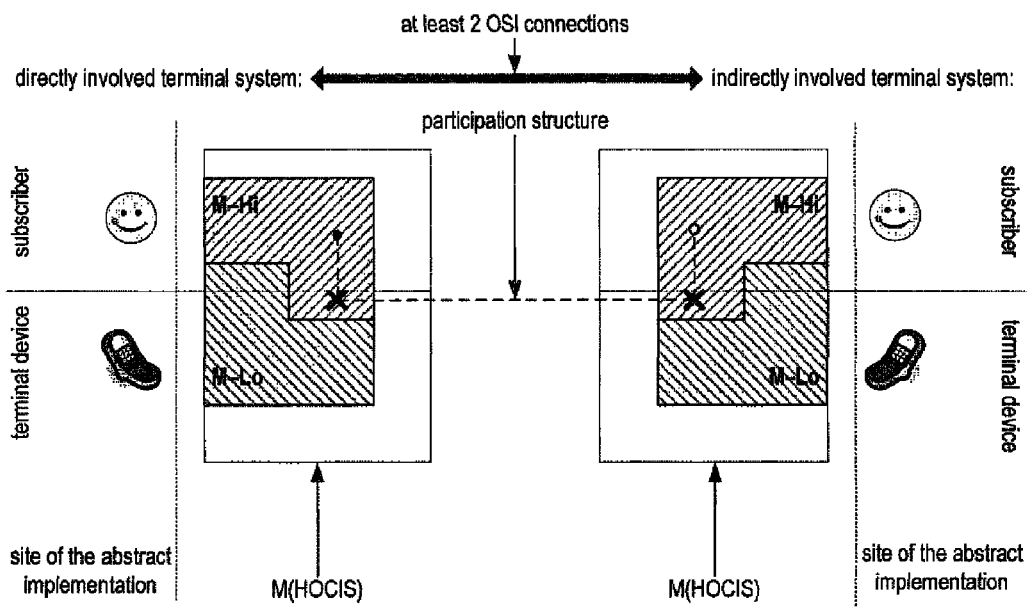
FIGS. 5a-5r are diagrams illustrating the information flow in various implementations of the present invention.
Figure 5B:
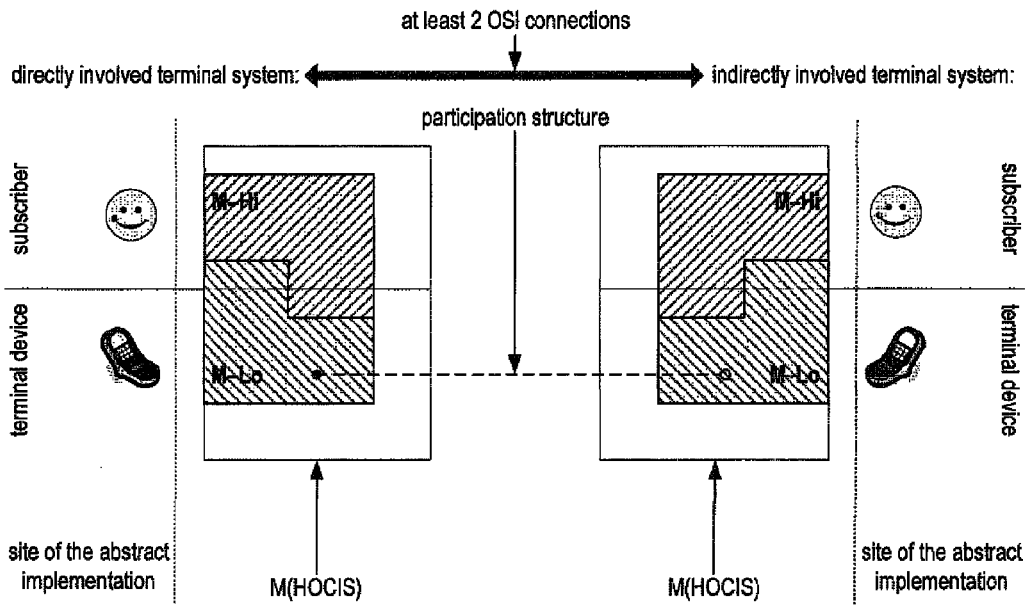
Figure 5C:
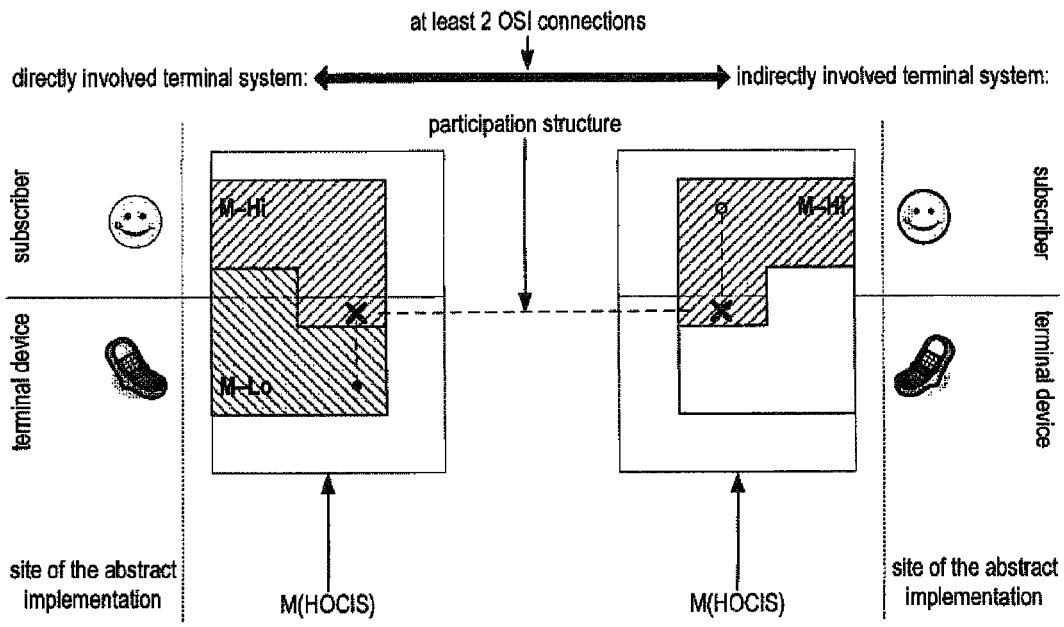
Figure 5D:
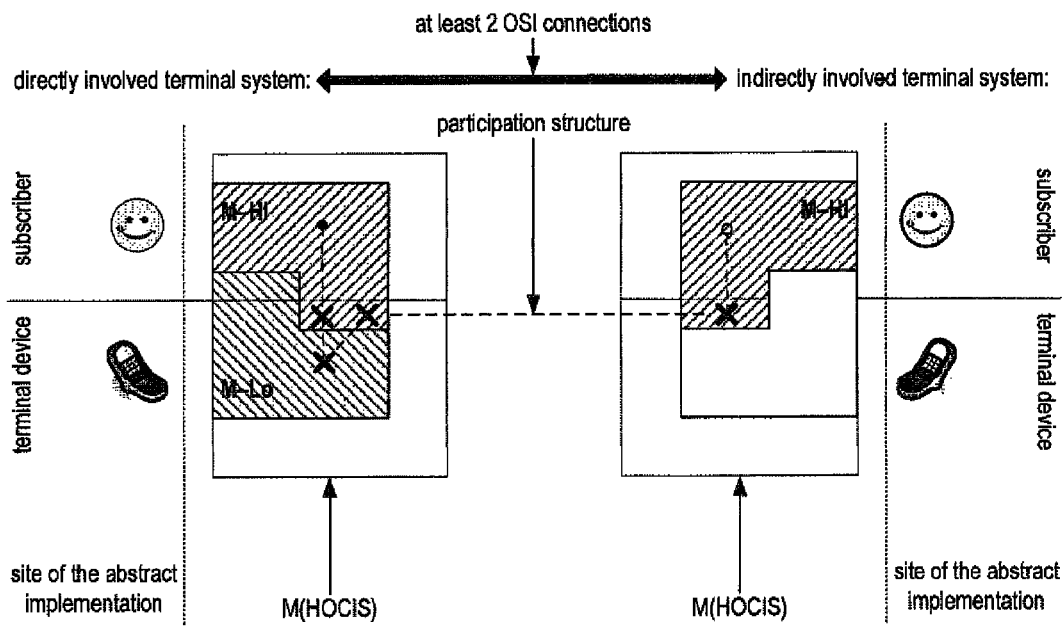
Figure 5E:
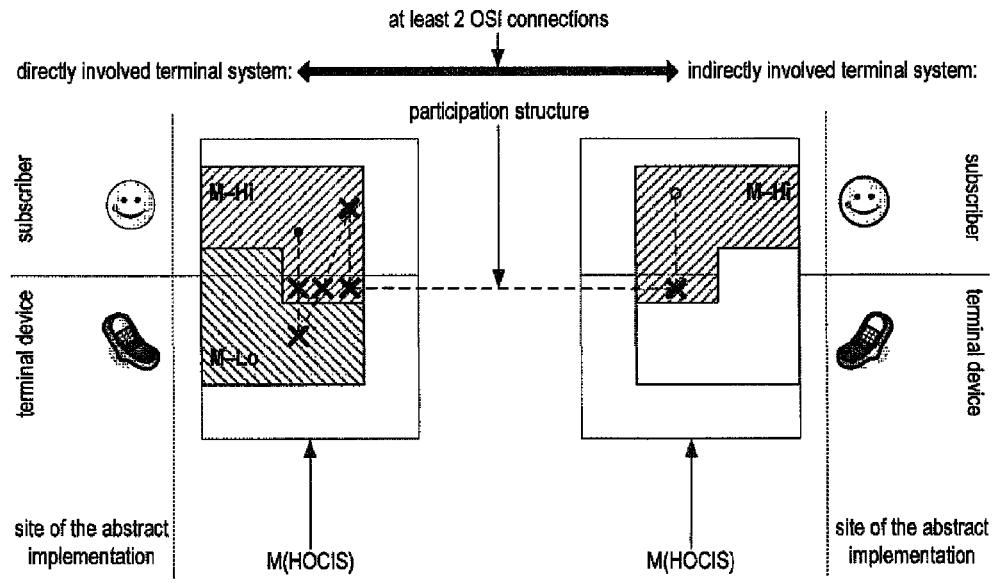
Figure 5F:
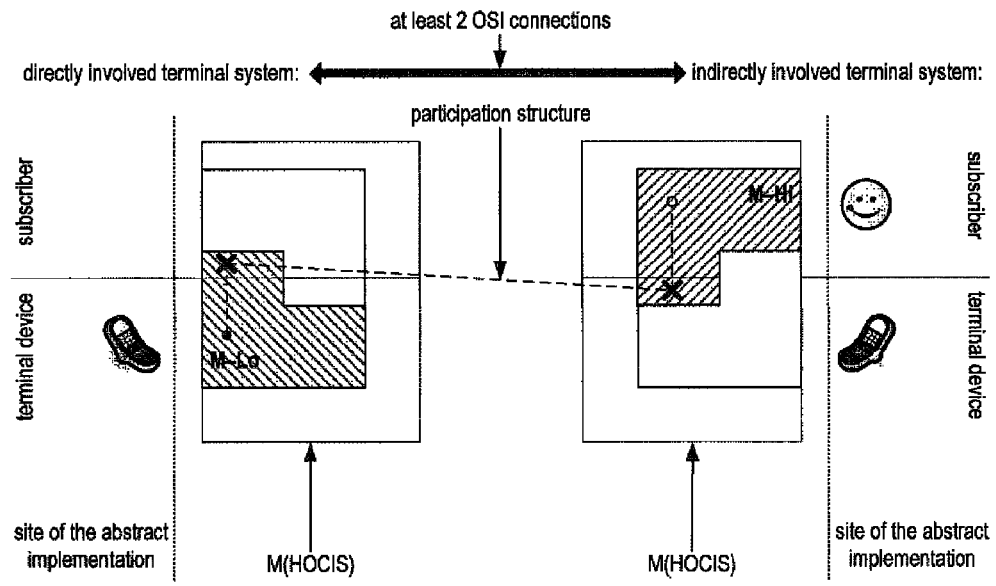
Figure 5G:
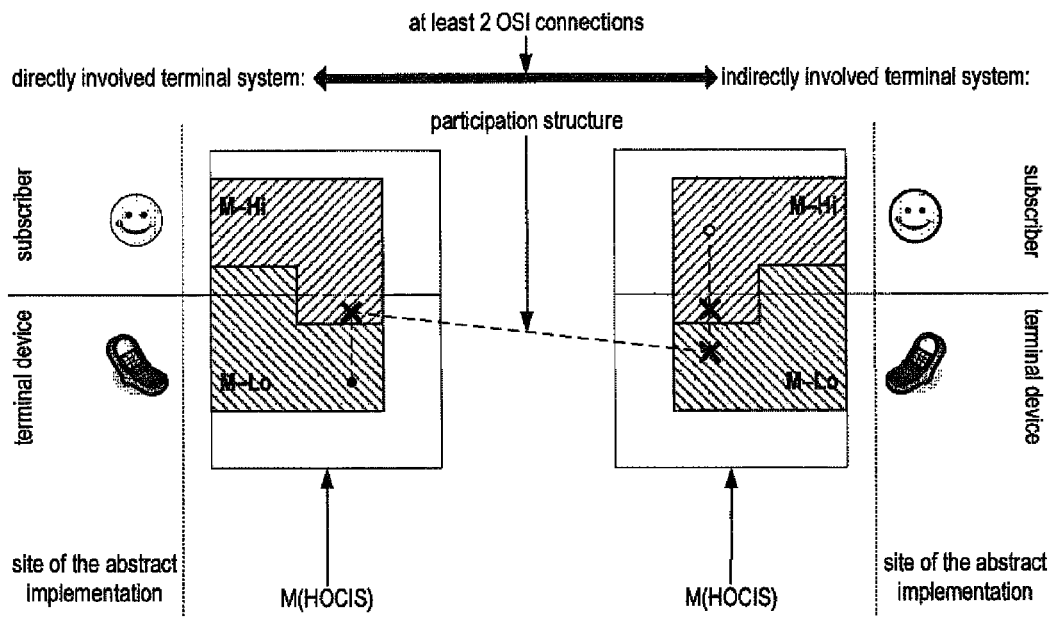
Figure 5H:
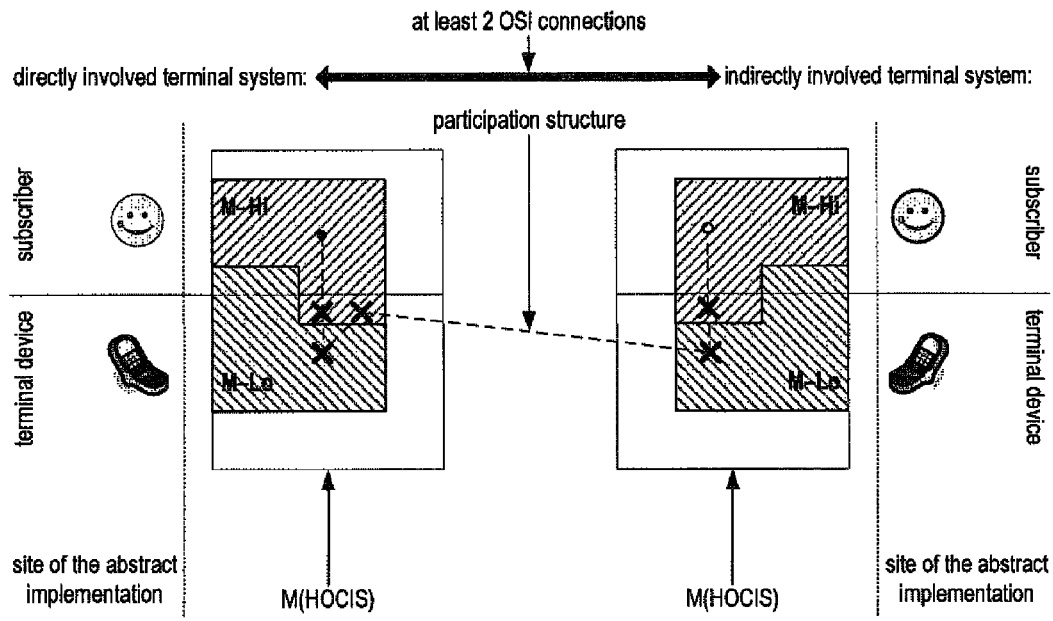
Figure 5I:
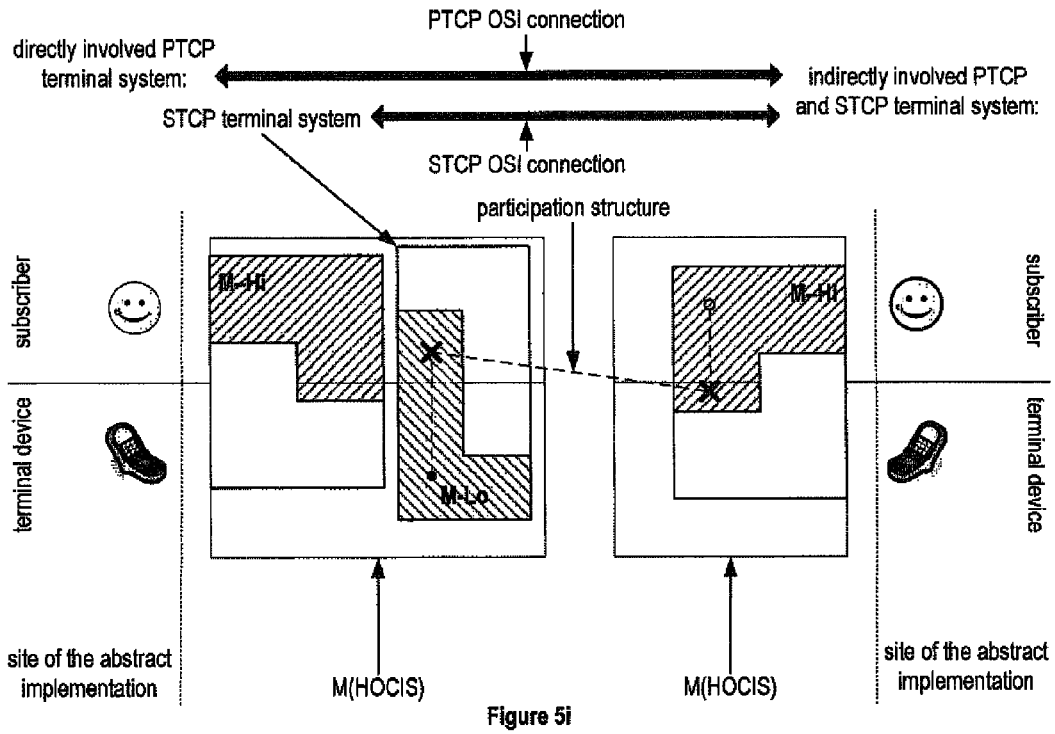
Figure 5J:
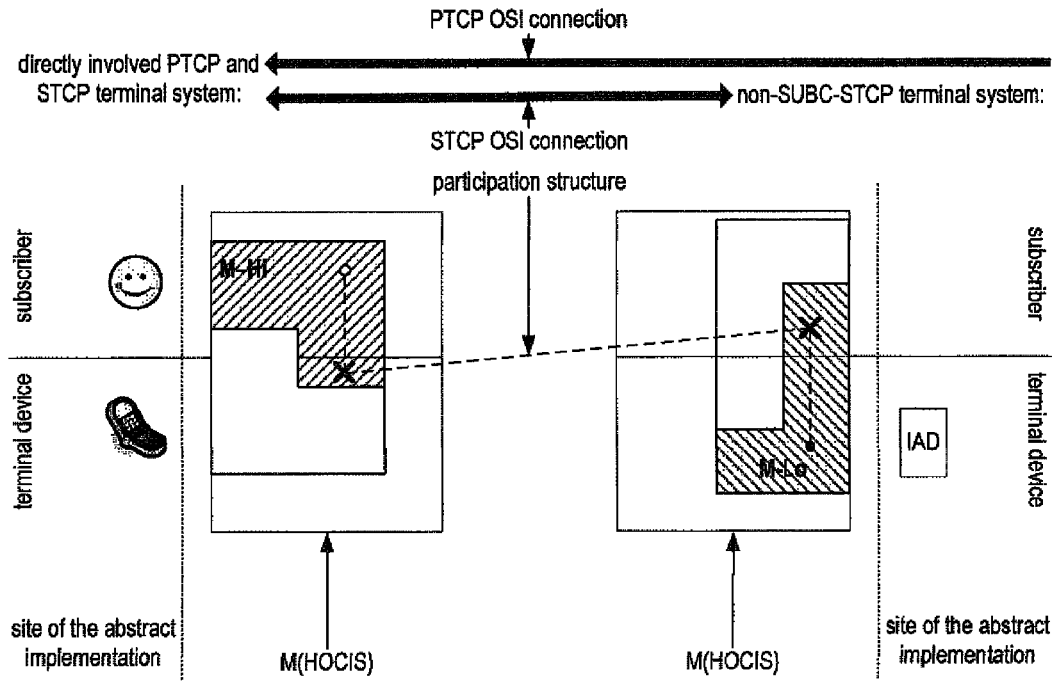
Figure 5K:
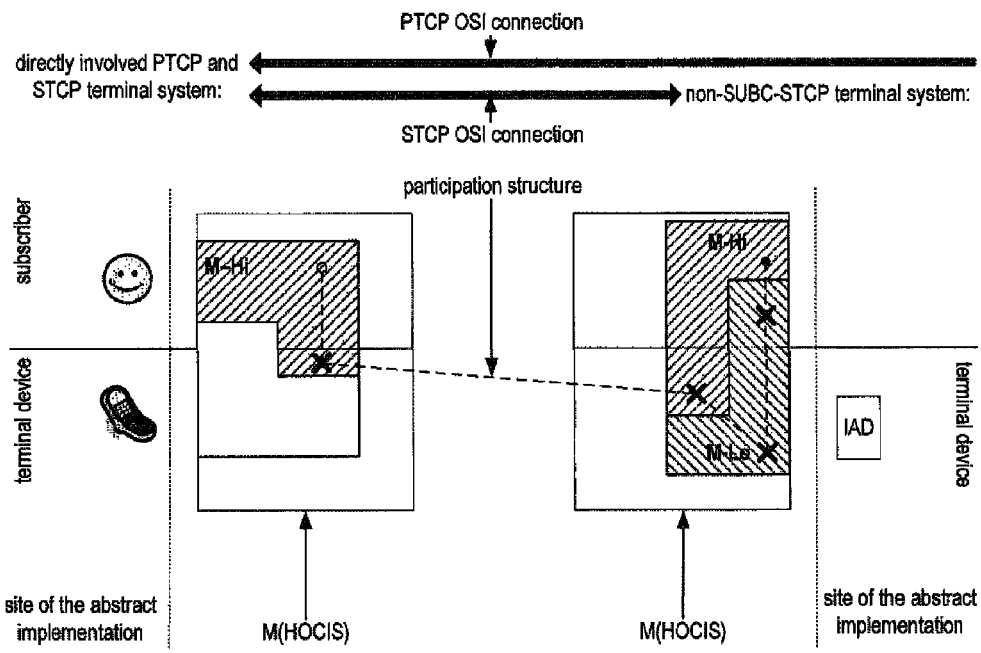
Figure 5L:
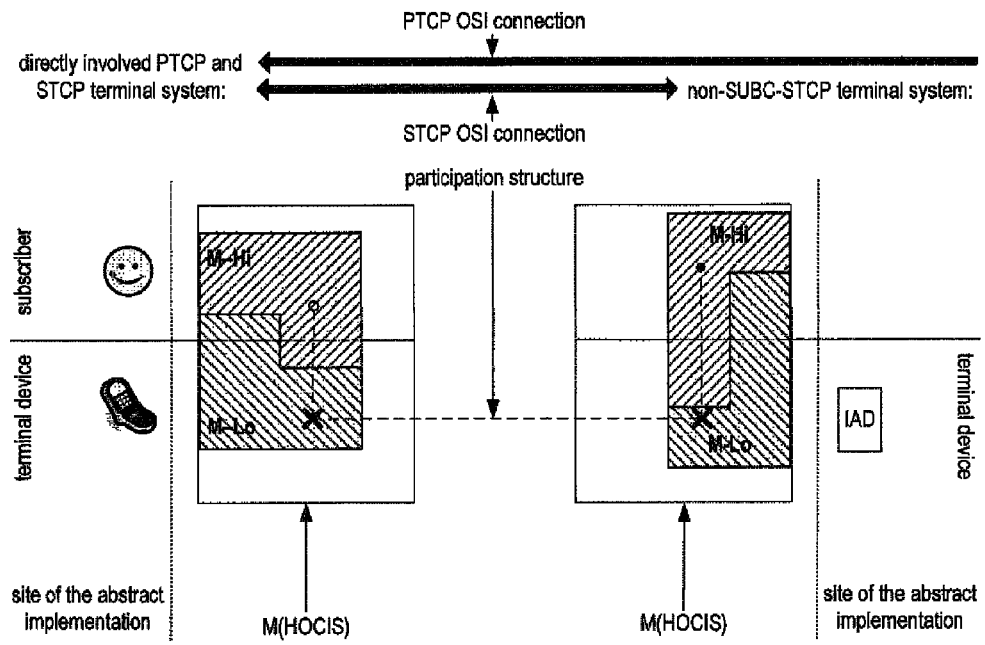

An abstract/concrete realisation/implementation conception of the HOCIS method according to the invention which is of interest to the mass market, more precisely: of a non-human module therefor, is a HOCIS-ISR server (see section D. and its FIGS. 5*j-l*). A HOCIS-ISR server of this kind can detect the presence of any signal in any data stream and react thereto, by providing the subscribers related to it with suitable HOCISs about it.

The login and/or enquiry of a primary communications process subscriber at a HOCIS-ISR server for example can take place vocally and/or through the input of a key combination or an SMS or without any input from his side, but possibly on the side of his ISP or MSP or a third party. The "HOCIS signal response" from the server—if it detects the signal sought by it in the data stream to be observed by it—to the subscriber who is to be informed about it can likewise take place over any network from which the telephone of this subscriber can receive a message.

D. Re Specifying the Understanding of the Meaning of Terms Defined Herein

This section D. is to help avoid the meaning and/or protection area of the present patent application from being determined from its descriptions of very limited concrete examples and being restricted to them—which is indeed "patent logically" absurd and more particularly in terms of patent law strictly inadmissible, but which has happened nevertheless to the authors of this written specification in legal disputes in the case of others of their patents and therefore has a very strong impression on the wording of this patent application—and not from its intentionally more abstractly formulated and therefore clearly wider reaching claims wording. The prime point of the method of interpretation, i.e. of the method of determining the content, of a patent from its claims wordings (compared to all otherwise possibilities of a method of interpretation/method of determining content of a patent) is namely fixed unmistakeably in all patent law standards.

For these two reasons section D. will explain/clarify below the essence of the invention of the present patent application—namely by deliberately setting out the individual essential features of the (generic) HOCIS-method according to the invention. The precise essence of such a technologically complex method (as the HOCIS method according to the invention) can—as the relevant person skilled in the art knows—namely not be concluded simply from the standard patent specification constituent parts (a) generally construed claim wording/meaning and (b) special descriptions of concrete embodiments (where applicable with illustrations).

Such a simplification of obtaining this precise understanding of the essence of the wording/meaning however is provided by fanning out this meaning by means of a number of dependent claims, namely split into groups of dependent claims illustrating method features (as explained in D.1.). It can thereby remain to be seen whether this procedure also contains a specifying of the single method main claim meaning (which is determined by the aforementioned interpretation according to European Patent Law of (a) by taking into consideration (b)).

Firstly however there should be a reminder of two aspects—already mentioned in part in this written specification:

The individual essential features of the method/apparatus according to the invention are subject to no restriction not mentioned in this written specification—in particular no restriction by an "overall connection" of the individual features of the method/apparatus according to the invention, by whomever such an "overall connection" may be surmised and however it may be construed, since it would not be justified by any word in this written specification.

Since all its claims wordings/meanings define these features of the method/apparatus according to the invention solely in essence, this written specification says absolutely nothing about the concrete implementation variations of these features—which are obvious to the relevant person skilled in the art—in any one embodiment of the invention, rather these features are "functional" alias "abstract", thus "purely conceptual".

After these explanations in the sub sections D.2.-D.4.—regarding the precise understanding of the features of the HOCIS method according to the invention, the precise understanding of the method of dependent claims groups in sub-section D.5. can be readily achieved through few words.

D.2. OSI RM Specifying/Simplifying of the Understanding of the Invention

Figure 3A:
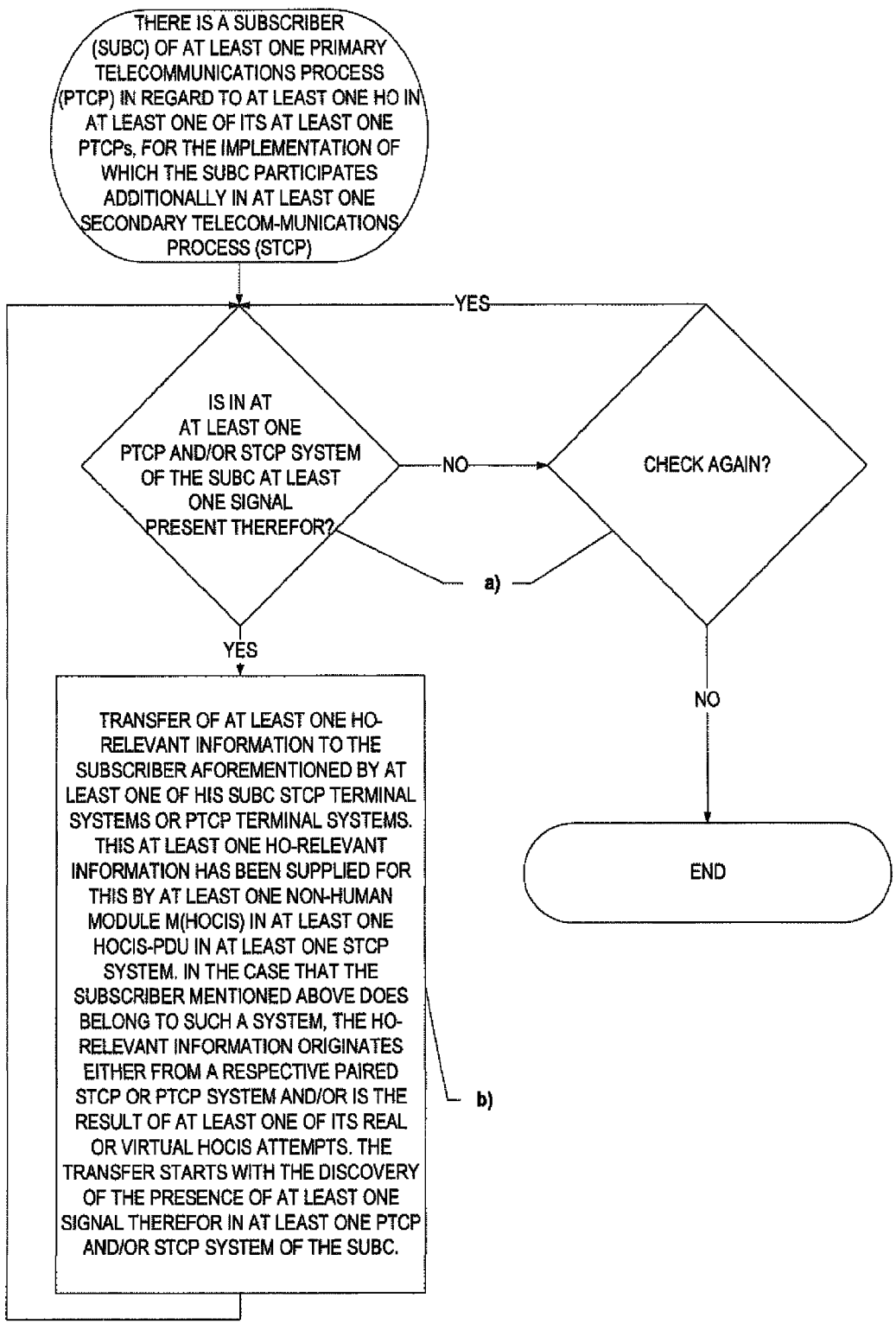
FIGS. 3a-3b are flow diagrams of a handover convenience information support process in accordance with the present invention.

The flow chart of FIG. 3*a* shows its functional method steps. Its box points at the implementation of which method steps of an embodiment of a HOCIS method is sufficient to qualify it. In this connection it is reminded that in this patent application no specific contents or features of the individual or overall handover-relevant information are considered—but only by whom to whom it is transferred and that it exists. In particular it is thus not considered here which specific meaning the handover-relevant information displays at all and when it displays it to a communications process subscriber, apart only from the fact that it "has something to do with an handover" (which can be discovered without doubt for any handover-relevant information in a concrete embodiment of the method according to the invention).

D.2.1.

Figure 3B:
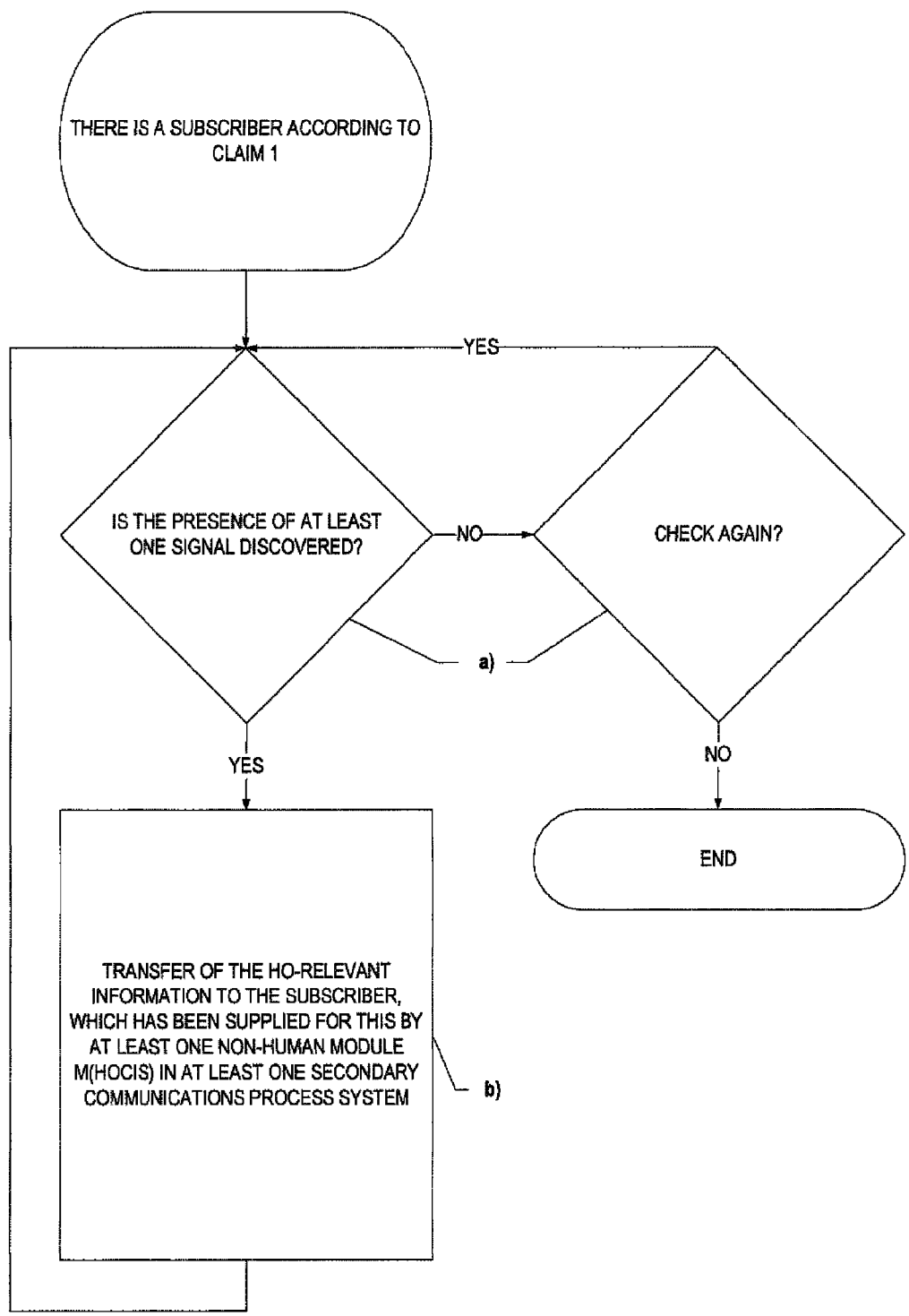

Since the relevant person skilled in the art is familiar with the OSI terminology/conceptuality which is "more handy" for him—than the natural linguistic type—the following pseudo claim 1' shall specify for him the understanding of the meaning of the claim 1 wording. Pseudo claim 1' is thereby only another wording for the wording of the claim 1, with the two wordings having the identical meaning. The flow chart of FIG. 3*b* shows the functional method steps of the pseudo claim 1'.

1': A method according to claim 1, considered as HOCIS service (according to the OSI reference model, i.e. provided by means of a HOCIS-OSI connection) for this SUBC in his HOCIS terminal system (which is thus a terminal system of this HOCIS OSI connection), which comprises the following features of this HOCIS service: It I. transfers to the SUBC the handover-relevant information which was supplied for it by at least one non-human module M(HOCIS) in the HOCIS-OSI connection, II. starts with establishing the presence of at least one signal for it in at least one terminal system or server of the primary and/or secondary telecommunications process, consists of at least the steps:

a) checking at least once for the presence of at least one signal according to II. and b) providing a service according to I.

That the meaning of pseudo claim 1' is not larger than that of claim 1, is clear to the relevant person skilled in the art since the wording of the former opens no room for any generalisation causing this.

However conversely it is to be ruled out that by specifying the meaning of claim 1 in pseudo claim 1'—by its wider use of the terminology/conceptuality of the OSI RM for describing the meaning of the HOCIS method—no limitation of the claim 1 meaning is undertaken. In this case the pseudo claim 1' meaning/protection area would be smaller than that of the claim 1. Pseudo claim 1' would then be a genuine dependent claim of claim 1.

The following pseudo claim 1" explicitly shows the hypothetical restrictions of the pseudo claim 1' in respect of claim 1: A HOCIS method according to pseudo claim 1" would indeed logically be according to claim 1 but not according to pseudo claim 1'—(because it does not meet its restrictions).

1": A HOCIS method according to claim 1 for which the following applies:

a) no transfer of handover-relevant information therein is a HOCIS service according to pseudo claim 1' and/or b) no transfer start therein is a HOCIS service start according to pseudo claim 1'.

The evidence for the fact that there are no HOCIS methods according to pseudo claim 1"—that thus pseudo claim 1' contains no restriction in any way in respect of claim 1—is trivial: The assumption of the existence of a HOCIS method according to pseudo claim 1" is immediately reduced to absurdity because it proves to be for the relevant person skilled in the art according to pseudo claim 1' and thus not according to pseudo claim 1", which contradicts this assumption.

An initial understanding of the claim 1 wording/meaning in this way is specified in this section D. through many further explanations. It thereby applies that all these explanations about claim 1 also analogously apply for pseudo claim 1'.

The following specifications for understanding the essence of the HOCIS method sometimes use its description through the pseudo claim 1' wording, i.e. the wording based on "OSI RM made up words/terms" familiar to the relevant person skilled in the art. However any explicit use of "OSI RM made up words/terms "is redundant insofar as just solely the natural verbal descriptions of the HOCIS method/apparatus according to the invention and the associated claims wordings clearly and unmistakeably define the meaning thereof, i.e. rule out their double meaning interpretation, i.e. correspond to the concerns of the OSI RM. Such explicit references to the OSI RM made-up words/terms—for example in the explanation of the participation structure of an STCP according to claim 1, i.e. more precisely: the STCP OSI connection—are only meant for the relevant person skilled in the art, for his self-ascertaining of the correctness of his understanding of the following specifications of the natural verbal claim 1.

D.2.2. Firstly Some Simple Clarifications of that which Claim 1 does not Rule Out.

The claim 1 wording/meaning contains for the HOCIS method according to the invention (which is associated with an handover of a PTCP) "no restriction to human/automatic communications processes between SUBCs", namely to communications processes between a human subscriber (on L7) indirectly involved in the handover and at least one non-human M(HOCIS), thus an automaton (which is located therein on any Li, $1<=i<=7$), directly involved in the handover. Rather it permits also person/person and automaton/automaton communications processes (see the definition of SUBC in section B.).

Claim 1 knows "no technical detail as regards the internal communication in a HOCIS terminal system"—it uses the expression "transfer of handover-relevant information" in the generic sense and this therefore contains no restriction whatsoever. The term "transfer of handover-relevant information" enables in particular that this information is made available to the SUBC anytime and anyhow for notification—that he then also actually has take note of them is not implied in this term.

The term "transfer" of handover-relevant information to the SUBC in claim 1 is moreover completely abstracted as regards the communications technical or local realisation of this transfer. More precisely: This transfer to the SUBC can take place over a network between the two involved HOCIS systems by including any functionality in the SUBC terminal system or locally solely in the latter.

The term "supplying" handover-relevant information for transferring to the SUBC in claim 1 means that it is detected by a non-human module M(HOCIS)—in the SUBC—or another HOCIS terminal system—and is forwarded from there for transfer to the SUBC. There is therefore only two variations from where handover-relevant information can get through to a SUBC: this is supplied only either by the M(HOCIS) of another HOCIS terminal system and/or from the M(HOCIS) of the SUBC HOCIS terminal system. Present day telephones are unable to provide a HOCIS according to the invention in the latter way but can very easily do so in the former way (see the explanations re FIG. 5).

The term of "checking for the existence of a HOCIS signal" according to claim 1 is likewise not restricted in any way. It says absolutely nothing regarding the terminal systems and/or forms of the existence and/or type of the HOCIS signal to which it can refer. The checking for the existence of a HOCIS signal takes place in particular in a HOCIS terminal system and can start at absolutely any time whereby as regards potential HOs there can be more than one checking/checked potential HOCIS terminal system. This in no way is a contradiction to the fact that PTCP and STCP terminal systems can be identical in concrete embodiments of the present invention (see next but one paragraph).

According to claim 1 a concrete embodiment of a HOCIS method thus encroaches into the protection rights aimed at by this patent application as soon as it—after the just discussed checking for the existence of some HOCIS signal in any terminal system as regards a potential or current handover—starts the transfer of an information relevant to this handover (to a SUBC suitably involved in this handover). I.e.: the success of this transfer to the SUBC in any extent is irrelevant for this encroachment.

As regards the dissimilarity/identity of/with each other of the terminal devices of a SUBC for its PTCP and at least one STCP, as regards the (non-human) functional module M(HOCIS) and as regards the originarity/transfer of handover-relevant information in claim 1 that which has already been said about this in the preceding sections and also that which will be explained on this in this section is to be taken into account, more particularly:

These PTCP and STCP terminal devices can with one SUBC (both in an abstract realisation and in a concrete implementation) be identical or partially or totally different from one another, the latter also TCP and/or handover and/or SUBC specific.

One or more HOCIS terminal systems (more precisely: by means of their respective M(HOCIS)) can be involved in the producing and/or transferring of the handover-relevant information.

The producing and/or transfer of handover-relevant information to a SUBC can be previously agreed "statically" for at least one M(HOCIS), thus its system, i.e. that with the occurrence of at least one specific condition in this M(HOCIS) system single-handedly and/or with the aid of at least one further system, this production and/or this transfer of handover-relevant information to a SUBC of the PTCP takes place wherein this M(HOCIS) system can be the SUBC HOCIS terminal system itself.

That which has been said above particularly does not rule out that at least one of the SUBCs of a HOCIS TCP in one or both terminal systems of at least one of its HOCIS OSI connections—in each of its terminal systems its current STCP-SUBC can change at any time where necessary—is permanently or temporarily an automaton, one terminal system and/or SUBC of the PTCP in which the handover takes place is different from all the HOCIS terminal systems/TCP-SUBCs of the HOCIS TCP associated with this handover—and vice versa, one PTCP terminal system uses a network different from a network which a HOCIS terminal system (of the HOCIS process associated with this handover) uses wherein both terminal systems accommodate at least one common PTCP-/STCP-SUBC or not.

D.3. HOCIS RM-Based Specifying of the Understanding of the Meaning of Terms

The basic specifying of the understanding of the meaning of terms took place in the previous sub-section by using the OSI RM as the basis. The sub-sections D.3.-D.5. now show that there are HOCIS TCPs whose specifying/simplifying the understanding thereof suggest that their explanations are based on a common "HOCIS reference model" (HOCIS RM)—because this makes many of the explanations superfluous which otherwise each of these HOCIS TCPs would require.

In view of the lesson described at the start of this section D. which the author of this written specification annoyingly received on account of others of his patents relating to communications technology, this effort in simplifying creating/specifying the meaning of terms herein—which under normal circumstances would be regarded as excessively long drawn out—is justified. Normally the relevant person skilled in the art would base the reading of terms on his own on such a model.

The HOCIS RM is compulsorily apparent from the general principle on which the OSI RM is based (particularly its above mentioned L7 standard) for the analysis of a TCP alias of a communications application. The special module sub-division shown below of its M(HOCIS) is thereby HOCIS-method-specific. This special module sub-division of the M(HOCIS) and its use in the FIG. 5 is very helpful, simple and precise to show whether a specific HOCIS method is according to claim 1 (alias according to pseudo claim 1') or not, and this both in its abstract and also concrete realisation/implementation.

The detailed nature of the following explanations of the HOCIS RM and 18 FIG. 5 should not be annoying:

The relevant person skilled in the art knows the inevitability of exactly this type of OSI-RM-based modelling of the conceptual basis of a non-trivial communications-technical method for the purpose of a simple and unmistakeable understanding of its description-wording—thus the necessity of the HOCIS RM therefor.

The 18 FIG. 5 serve for simplifying the understanding of the use of the HOCIS method—they only show the most important of its many useful possibilities.

Now to the structure of the HOCIS RM. Only for the purpose and area of these FIG. 5 do we make the somewhat simplifying assumption (already mentioned above) that the abstract realisation of the abstract STCP terminal devices takes place in abstract PTCP terminal devices (i.e. here: in abstract telephones and/or abstract servers/IADs). With the PTCP-SUBCs there are then no independent HOCIS terminal devices. This simplification however does not rule out that the abstract realisation of at least one abstract HOCIS terminal device
takes place by means of more than one abstract PTCP terminal device (thus "distributed") and/or even completely outside of the abstract PTCP terminal devices (thus "outsourced")
both used in the last FIG. 5. This simplification is anyhow irrelevant for the method main claim (since it is completely abstracted from realisation aspects), and apparatus dependant claims explicitly disclose that the apparatus main claim is not based on it.

For the purpose of illustrating the HOCIS RM we will now consider the most important structure elements of FIG. 5 (whose details are explained in sub-section D.4.), because they are the most important part of the HOCIS RM. These are alone the functional M(HOCIS) modules and their subdivision into M-Lo-/M-Hi-modules, as well as the dotted lines running between the M-Lo-/M-Hi-modules. (In addition these figures contain some accessories which are, however, irrelevant to the HOCIS RM itself, which only indicate its surroundings. Two examples of this are: Their bold double arrows which stand for respectively one TCP OSI connection and their terminal system boxes which each contain at least one M(HOCIS) and outline the relevance thereof to reality, as will be explained below). It should be noted that it is completely irrelevant here which entities alias modules of the PTCP there are—apart from the PTCP terminal systems themselves, for more on this see above, —which are therefore neither shown here.

The HOCIS RM undertakes as regards the abstraction level and meaning contents of the layers 4-7 according to the OSI RM, and thus with regard to the M(HOCIS), one of the nowadays often practiced simplifications (see for example J. Schiller, Mobile Communications, page 17, ISBN-13: 978-0-321-12381-7): By "L7" is meant here the entirety of L4-L7 of the OSI RM—wherein the bold type of L7 is meant to indicate this oversimplification of the OSI RM terms/conceptuality for the purpose of simplifying the following explanations. This notation simplification thus implies no modification of the terms/conceptions of the OSI RM—which are used furthermore and without bold type—and no change of meaning of the claim 1 wording.

Corresponding to this simplification the FIG. 5 show of these HOCIS TCP terminal systems—they are, owing to the above simplification, mostly also PTCP terminal systems, see above—respectively only their providers of their "L7-HOCIS functionality" through the L7-M(HOCIS) modules. The latter are shown by the shaded areas in the two aforementioned informal L7-HOCIS terminal system boxes. According to the OSI RM the L7-HOCIS functionality is provided by L7-HOCIS interactions of the L7-M(HOCIS) alias "L7 entities" in and by means of the HOCIS-OSI connection—here more precisely: in/by means of their L7 HOCIS OSI connection.

Some explanations about the (initially two each) L7-HOCIS terminal system boxes: Their two inner columns show the respective L7-M(HOCIS) whilst their two outer columns show the site of the (abstract) implementation of the respective L7-M(HOCIS) in its terminal system, i.e. an abstract telephone apparatus or IAD or its abstract user alias SUBC (insofar as this is present).

The latter divides an L7-M(HOCIS) into abstract realization alias abstract levels:
  The upper abstraction level models the entity of the abstract interactions of the L7-M(HOCIS)—with whomever—for the purpose of the transfer according to claim 1 of handover-relevant information to a SUBC.
  The lower abstraction level models the entity of the abstract interactions of the L7-M(HOCIS)—with whomever—for the purpose of detecting/modifying/evaluating/generating/ . . . the handover-relevant meaning of at least part of this information, thus the supplying of handover-relevant information, prior to the transfer according to claim 1 (as well as the L4-L6 OSI RM meanings which are to be added through the above L7 oversimplification).

Accordingly, in the HOCIS RM each L7-M(HOCIS)-entity/module consists of an "L7-M(HOCIS)-Hi"-entity/module and an "L7-M(HOCIS)-Lo"-entity/module.

In the following the prefix "L7-" and the suffix "-entity/module" are mostly omitted—as also increasingly the character strings "(HOCIS)" and "HOCIS", particularly in the module identifiers.

Further details
  on these two types of interactions of the two respective M-Hi and M-Lo in each HOCIS-OSI connection—with whomever—and
  on the handover-relevant information to be transferred
are not considered in the HOCIS RM.

The question of whether a HOCIS TCP is according to the present invention or not is decided by the "participation" of the M-Hi and M-Lo modules in the HOCIS TCP terminal systems in supplying and transferring handover-relevant information to one of their SUBCs. In OSI RM terminology/conceptuality: is decided by the participation of the M-Hi and M-Lo modules in at least one L7-HOCIS-OSI connection of this STCP (as will become apparent shortly).

Accordingly in the HOCIS RM of an STCP generally only its at least one L7 STCP-OSI connection is considered wherein it models its interaction with a
  SUBC as interaction with the M-Hi corresponding to it, and
  terminal device as interaction with the M-Lo corresponding to it.

In other words: In the HOCIS RM a PTCP-/STCP-SUBC is modelled in a PTCP/STCP terminal system by an M-Hi, and the M-Lo therein models its supplying-functionality of handover-relevant information. These pairs—(last mentioned functionality, M-Lo) and (SUBC, M-Hi)—are thus respective synonyms in the HOCIS-RM. The semantics of the interactions inside each of the two synonym pairs is outside of the HOCIS RM.

In the HOCIS RM the term/conception of "participation" of an M-Lo and M-Hi respectively in the supplying and transferring of handover-relevant information has prime importance. It means: An M-Lo or M-Hi is "participating" in the transfer according to claim 1 of handover-relevant information if this is generated and/or detected and/or modified as regards contents or display and/or is supplied and/or is forwarded and/or received and/or consumed by it partially or totally in some way. This participation of an M-Lo or M-Hi respectively stands for the participation of its respective M(HOCIS). It takes place as a rule automatically, but can however also be initiated where necessary by the SUBC.

A thus participating M-Lo or M-Hi of the HOCIS RM is also called in this printed specification a "relay" alias "L7-relay". (An L7-relay is thus a conceptual coarsening of at least one OSI RM type Li-specific relay—following the conceptual coarsening shown above of the higher Li-connections to an L7 connection). The two relays in the initiator and addressee modules respectively of a transfer of handover-relevant information are called "terminal points" of this transfer, wherein the addressee module is always an M-Hi and at least one M-Lo always participates in the transferred handover-relevant information. In order to distinguish these two initiator and addressee HOCIS terminal points of a transfer of handover-relevant information from further "relay points" of this transfer, in FIG. 5 the former are marked by a solid and hollow bullet respectively and the latter by a bold cross. A HOCIS relationship defined by the terminal points of a transfer between the STCP terminal systems can exist both temporarily or permanently and bi-directionally or uni-directionally or even not at all.

In simple cases only one M-Lo directly involved in the handover and one M-Hi indirectly involved need participate as terminal points in a transfer of handover-relevant information between two STCP terminal systems. It can be "relayed" by the telephone-resident part (see below) of the directly involved M-Hi, which causes these two to be participated, or through the indirectly involved M-Lo, which causes this to be participated—if these are present in the two terminal systems.

The dotted lines of the 18 FIG. 5 show—for a transfer of handover-relevant information—both the sequences of the inclusion of the M-Lo/M-Hi into such participations and also their respective basic relaying functionalities therein. This route of the dotted line is called "participation structure" in a transfer of handover-relevant information.

The HOCIS RM makes the precise understanding of the invention easier—which for reasons of simplification is by way of example restricted in FIG. 5. In particular it is easily seen that in a transfer of handover-relevant information to an M-Hi this was supplied for this by an M-Lo in
  either a different HOCIS terminal system than that of the M-Hi
  and/or the HOCIS terminal system of this M-Hi.

D.4. Facilitating the Understanding of the Meaning of Terms by the FIG. 5

Now for facilitating the precise understanding of the meaning of terms by means of the HOCIS RM and the 18 FIG. 5 wherein the simplifications mentioned above are retained.

D.4.1

In order to avoid any uncertainty regarding the HOCIS RM in the FIG. 5 it should be noted in addition that an (abstract) interaction between the
  M-Hi and the perception-/generating-/understanding-functionality of the real telephone user modelled by it (the latter outside of the HOCIS RM) locally for the most part is located in his head, partially however also in his telephone (owing to the abstract hardware of the human/machine interface of the telephone, e.g. its microphone, speaker, display, keypad, . . . ). This conditions the low position of a part of the lower edge of the M-Hi in the FIG. 5.
  M-Lo and the real supplying-functionality modelled by it of handover-relevant information (the latter outside of the HOCIS RM) according to the invention must allow an M-Hi to find out about the result of this interaction. According to the invention the M-Lo must thus be able to communicate with an M-Hi and for this to comprise the M-Hi functionality required for this (for example for the generating and inserting into the voice channel for this M-Hi of handover-relevant voice information for it)—independently of whether the user of its own telephone is participating in the HOCIS TCP or not (for example because he has just locally switched it off for himself). This conditions the high position of a part of the upper edge of the M-Lo in the FIG. 5.

An M-Hi or M-Lo of an M(HOCIS) respectively is thus in the HOCIS method—and therefore the HOCIS RM—not restricted to its respective "actual" abstraction level: Rather in the HOCIS RM parts of both the M-Hi and of the M-Lo functionalities are located on the respectively other abstraction level and these parts are then sometimes called "non-actual" M-Hi or M-Lo.

Dividing up these entities/modules of the M(HOCIS) into the two abstraction levels of the HOCIS RM facilitates a specific and very technical manner of specifying the understanding of the claim wording/meanings of this patent application. However it is possible to dispense with this division: None of the claims namely makes use of it. They all dispense with a rigorous sub-division of an M(HOCIS) and use instead some M(HOCIS) attributes—which compared to it are more colloquial, simpler and entirely adequate—which sub-section D.4.12. summarises/defines.

D.4.2.

FIGS. 5*a*-*b* show firstly that claim 1 does not include a HOCIS method, whose STCP OSI connection (the PTCP OSI connection is not considered, as already mentioned above) has only either solely the displayed Hi or Lo connection on the L4-L7 of the OSI RM. The reason for the exclusion from the claim 1 protection area of these two types of HOCIS OSI connections on the basis of their participation structures—although they do not correspond to any state of the HOCIS technology because this does not yet exist (see the section A.)—is that the participation structure in 5*a* would offer an obvious (and thus not capable of protection) HOCIS technology and the one in 5*b* would offer no HOCIS technology at all:

In 5*a* the two telephoning parties discuss by means of the Hi-connection something as regards an handover—presumably thus carry out some HOCIS for one another—but the non-human module of this terminal system directly involved in this handover according to claim 1 does not participate in such a HOCIS-OSI connection (and thus in the handover-relevant information transferred in it).

In 5*b* the telephone user indirectly involved in an handover does not participate in such a HOCIS since the HOCIS OSI connection here—it contains on L4-L7 solely the abovementioned Lo-connection—does not enlist the indirectly involved M-Hi—i.e. it transfers no handover-relevant information to its SUBC.

It should be noted however that it does not interfere in an STCP OSI connection if this additionally contains a Hi-connection and/or Lo-connection.

D.4.3

The four FIGS. 5*c*-*f* show next the participation structures of only four of the thus far simplest HOCIS OSI connections insofar as the telephone indirectly involved in the (for example potential or current) handover contains no M-Lo—i.e. the implementation of this telephone does not support the HOCIS method in any way, thus for example is a present day standard telephone.

These pragmatically therefore important participation structures of these four HOCIS OSI connections incidentally display as regards the HOCIS for a PTCP-SUBC indirectly involved in an handover the central message of the invention (the significance of the HOCIS method for the directly involved PTCP-SUBC will be considered further below). In order to graphically emphasise which of the two PTCP-SUBCs is the most favoured each time in the following FIG. 5 through the HOCIS, it is shown with a thicker border (than that of the other SUBCs)—this is also the SUBC in whose M-Hi the "participation structure ends".

More precisely: Once one is conversant with these four participation structures then the "participation structures" reveal no more misunderstandings up to FIG. 5*i* regarding the HOCIS for a PTCP-SUBC indirectly involved in an handover. More particularly it should be pointed out here that—if the indirectly involved telephone contains no M-Lo—there is for the communication between two terminal systems only the "voice channel" for the exchange of handover-relevant information of the STCP (whilst there can otherwise be for this for example another concurrent "data channel" for handover-relevant non-audio information of the STCP.)

In these four figures it is only assumed that the indirectly involved telephone user correctly understands the HOCIS transferred in natural speech (and transferred by "voice channel") to him. This articulates the modelling of this user—thus that he knows how to correctly interpret this HOCIS—by allowing him an M-Hi. I.e.: The modelling of an absolutely "unable-to-understand-HOs" or absent indirectly involved SUBC would provide no M-Hi.

In FIG. 5*c* the user of the telephone directly involved in an handover has nothing to do with the HOCIS TCP, his actual M-Hi is not participating in such (but only his telephone-resident part, i.e. his non-actual M-Hi, see above)—for some reason, possibly because he does not wish to be bothered by it and therefore has temporarily switched off his HOCIS interactions or because he simply does not care about it. Here the actual M-Lo directly involved in the handover initiates the HOCIS TCP and transfers an handover-relevant information to the actual M-Hi indirectly involved therein—wherein this transfer is relayed from the former to the latter in the directly involved non-actual M-Hi and the indirectly involved non-actual M-Hi. The first M-Hi-relay thereby provides as regards the transfer according to claim 1 of handover-relevant information the "translation functionality" corresponding to it (here: for the handover-relevant information of the directly involved M-Lo to generate a message of identical contents in human language and to insert this into the voice channel to the indirectly involved non-actual M-Hi, i.e. initially to its speaker relaying this message to its subscriber or to its buffer—whenever the directly involved M-Lo wants to let the SUBC to have this handover-relevant information, alias this HOCIS).

The novelty of the FIG. 5*d* over 5*c* exists solely in that now the STCP, i.e. its HOCIS OSI connection, is initiated by the directly involved actual M-Hi (thus by the model of the directly involved SUBC). It must then enlist the directly involved actual M-Lo (thus the model of the directly involved telephone) (in order to supply there handover-relevant information for transfer to the indirectly involved actual M-Hi)—after which it continues as in 5*c*. The relay in the directly involved non-actual M-Hi on this route now provides as regards the transferring according to claim 1 of handover-relevant information the translation functionalities (additional compared to 5*c*) corresponding to it, namely the translation of the selection of the handover-relevant information selected by the directly involved initiator of the HOCIS OSI connection in the directly involved telephone/s in their corresponding detecting in the M-Lo.

The novelty of FIG. 5*e* compared to 5*d* consists solely in that now the directly involved M-Lo is able to supply the handover-relevant information selected by its M-Hi (=SUBC)—which the M-Lo accordingly supplies for the transfer to the indirectly involved M-Hi—but it can however only transfer it to its own SUBC M-Hi, e.g. by its graphic display. This SUBC (=directly involved actual M-Hi) must now itself for example "packet" it into a message in human language and relay this handover-relevant information to the directly involved non-actual M-Hi, i.e. to its microphone—after which it continues as in 5*c*. The directly involved SUBC here acts thus as a relay (additional compared to d).

The novelty of FIG. 5*f* over 5*c* consists solely in that there is here now no telephone user directly involved in the handover. This corresponds to the practical situation that for example at the moment of initiation of the HOCIS OSI connection through the directly involved L7-M-Lo the user of this telephone has temporarily suspended his PTCP on which the handover relating to it is based, in order to temporarily participate with his telephone in a different PTCP (which has nothing to do with this handover), so that he cannot learn anything about the STCP of the first PTCP. The HOCIS RM displays this through the absence of the directly involved actual M-Hi. Accordingly with this HOCIS method the directly involved M-Lo has the functionality which its non-actual M-Hi has in 5*c*.

It can be seen in the participation structures of these figures that one module is repeatedly participating in several of them. According to claim 1 this fact is no problem at all. Since moreover claim 1 requires no multiple participations, in the following figures increasingly of several relay points of one module in a participation structure only one will be displayed anymore, with which it is also consistent that the M(HOCIS) functionalities in its non-actual M-Lo can be displayed in its non-actual M-Hi and vice versa so that the HOCIS RM could combine both equally well into one M-HiLo—if one disregards the impairment in aesthetic categories sometimes caused thereby which the relevant person skilled in the art would however recognise as such and which would therefore be irrelevant here.

With regard to the four figures previously explained, it can be noted that they in no way list all the participation structures of the transfer of handover-relevant information in HOCIS processes in which the indirectly involved telephone cannot support a HOCIS process (because it contains no M-Lo functionality, as modelled in them). The relevant person skilled in the art namely immediately recognises that for example all 4 types of HOCIS OSI connections just explained can as well be initiated by the indirectly involved PTCP-SUBC—possibly by typing in a DTMF code or by his input of a natural-language command or by transmitting an SMS message or another signal over any network (which can be modelled by its correspondingly functionally specified M-Hi), to the receipt of which the directly involved M-Hi and/or M-Lo suitably reacts. The associated participation structures are in the meantime obvious—thus need not be demonstrated or discussed further here.

It would be equally superfluous to discuss the fact that the claim 1 wording/meaning also covers HOCIS methods which provide before/at the required transfer there of at least one handover-relevant information some other information exchange and/or some interaction between whomever.

This biodiversity of already the most elementary "participation structures" is considerably increased in that the left or both of the telephones just considered is/are (an) FMC telephone(s) in which the GSM/CDMA- and WLAN/Femtocell-functionalities have different HOCIS functionalities. Since the new participation structures made possible thus are "straightforward derivable" fixed-mobile combinations of the previously shown participation structures, they are not elaborated on further in this written specification—because they can be identified by the relevant person skilled in the art without problem. I.e. the exemplary HOCIS configurations of FIG. 5 are based on the further simplifying assumption that the HOCIS functionalities of the fixed and mobile components in these configurations would be identical.

D.4.4.

The two FIGS. 5*g-h* show the participation structures corresponding to the two FIGS. 5*c-d* which become possible in that the indirectly involved telephone now contains likewise a complete M(HOCIS), i.e. an M-Lo, too—each terminal system with an "handover-knowledgeable" PTCP-SUBC (see above) contains an M-Hi—so that there can be between the two terminal systems in addition to the "voice channel" a "data channel", too, for the transfer of handover-relevant information. Complementary or alternatively to the until now generally single "communications channel" between the two telephones and their SUBCs, the "voice channel", it is possible for HOCIS methods to use these functionalities and operate a "data channel" between their two M-Los, wherein this can use the same network with the same network features as the voice channel or uses at least another networks variation.

To conclude the discussions up to here about participation structures in "server-free" (as a rule "subscriber/subscriber") transfers of handover-relevant information it should be noted that in these exemplary scenarios a terminal device without M-Lo directly involved in an handover—i.e. a current "GSM/CDMA only" telephone—cannot initiate the HOCIS method, more particular: an STCP, by itself. But in the case that it cooperates with a HOCIS server/IAD (or HOCIS telephone) this can change insofar that these HOCIS terminal systems realise a "virtual M-Lo", as will become clear below.

D.4.5.

The 10 FIGS. 5*i-r* show in turn examples of the simplest participation structures during the transfer to a PTCP-/STCP-SUBC of any handover-relevant information, now however with the aid of the functionality of a "HOCIS server"—preferably developed as "HOCIS IAD"—firstly in the 6 FIGS. 5*i-5n*. The 4 FIGS. 5*o-5r* then explain a further HOCIS-IAD becoming available.

These 10 figures show simplest participation structures not insofar as that all already previously explained participation structures during the transfer of handover-relevant information are repeated, but now with the use of a server/IAD as L3-router in the STCP OSI connection on which this transfer is based. In this case this server/IAD did not contribute itself to the HOCIS communications application, more precisely: the L4-L7 of this HOCIS OSI connection would not see the use of this server/IAD at all so that its participation structure cannot be changed by the HOCIS server/IAD, thus is already included in the above.

Rather in the following the server/IAD now contributes to at least one HOCIS communications application itself (more precisely: to the L7-connection in its OSI connection): It belongs with at least one of its M(HOCIS) modules to its participation structure. This case is particularly important if the telephone involved in the (for example potential or current) handover cannot itself support a HOCIS process (it contains no M(HOCIS), thus is a conventional telephone): A suitable "proxy-M(HOCIS)" in at least one server/IAD can then compensate for "HOCIS inadequacies" in a PTCP/STCP of such a "non-HOCIS" telephone—as will be explained in further detail below.

The difference between HOCIS servers and HOCIS IADs is thereby to be seen mainly in the fact that the former are realised as a rule technically "WLAN-independent" and as a rule are under the control of a "WLAN-independent" administrative management, whilst the latter are as a rule dependent in some way or other on at least one WLAN.

These 10 figures show finally examples of the simplest participation structures with HOCIS-servers/IADs insofar as they postulate the additional simplification, —extending beyond the simplifications provided up until now—that each time only one single HOCIS server/IAD belongs to the participation structure of an STCP OSI connection. This however in no way means that a SUBC STCP terminal system would at any time support only one STCP, as discussed in detail in the two FIGS. 5*q-r*.

The relevant person skilled in the art can ascertain without problem at the latest on this understanding basis—covering the following comments on the 10 FIGS. 5*i-r*—of a concrete embodiment of a HOCIS method (with or without support through at least one HOCIS server/IAD) whether the participation structure of its OSI connection is according to claim 1 or not, even if it embodies none of the aforementioned simplifications.

FIG. 5*i* provides a particularly simple insight into a simple "HOCIS configuration with HOCIS IAD": Its right hand M(HOCIS) corresponds to one in 5*c-h* whilst the left M(HOCIS) does not differentiate between HOCIS-IAD and directly involved terminal system, thus postulating that both form a unit. For reasons of clarity the PTCP and the STCP OSI connection are shown here (and in the following) separately from one another, wherein both OSI connections on the right with the M(HOCIS) end in a common PTCP/STCP terminal system, whilst on the left the both the PTCP L7-connection (of the PTCP OSI connection) and also the STCP L7-connection (of the STCP OSI connection) can each end independently of one another in a SUBC PTCP or SUBC STCP terminal system or PTCP IAD or STCP IAD terminal system (or mixed in any way). In 5*i* in particular—with regard to the STCP—the M-Hi- and/or M-Lo-functionalities of the directly involved telephone can thus as a whole or in part be duplicated in the IAD, distributed complementarily to both devices or be located solely in the IAD. The FIGS. 5*j-n* fan out this further, starting from the structure explanation of the next paragraph.

In 5*i* the HOCIS IAD can therefore—as regards the at least one STCP supported by it—contain at least the following three different M(HOCIS):

one M-Hi for an STCP of the IAD with the indirectly involved telephone one M-Hi for an STCP of the IAD with the directly involved telephone, one M-Lo which can provide completely or partially the functionality of a directly involved M-Lo regarded up until now as telephone-internal—this M-Lo in the IAD is then thus the already aforementioned "proxy-M-Lo" of the telephone or its user alias its "virtual M-Lo" in the IAD.

A virtual M-Lo of a PTCP/STCP terminal system or its user will be discussed from time to time further on and then—for the reasons mentioned in sub-section D.4.12. —is called its "virtual M(HOCIS)". It can execute the M-Lo-information detection/transfer better in some circumstances than a telephone-internal M-Lo: It can for example still have access to the voice channel between the M-Hi of the two telephones, whilst a telephone-internal directly involved M-Lo has already lost this access to the indirectly involved M-Hi.

Figure 5M:
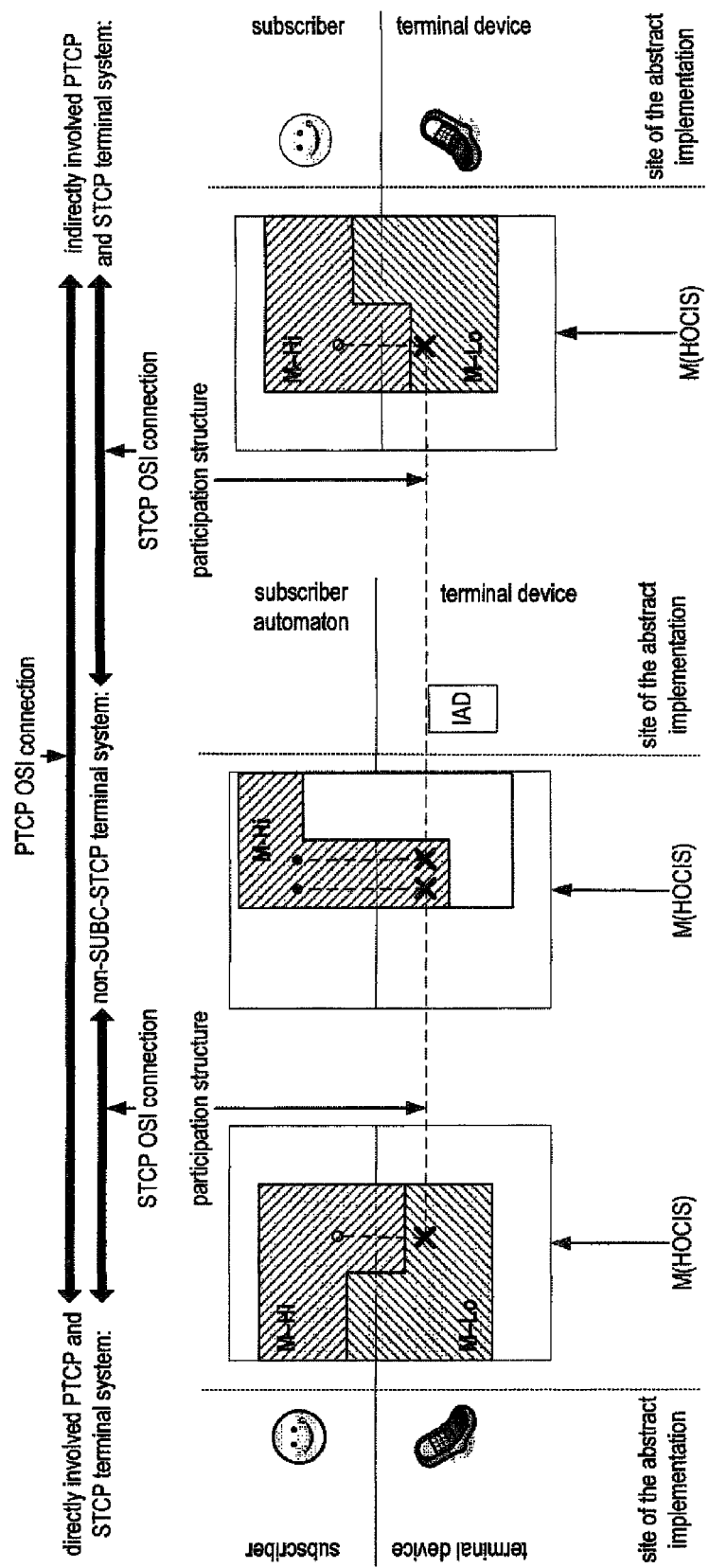
Figure 5N:
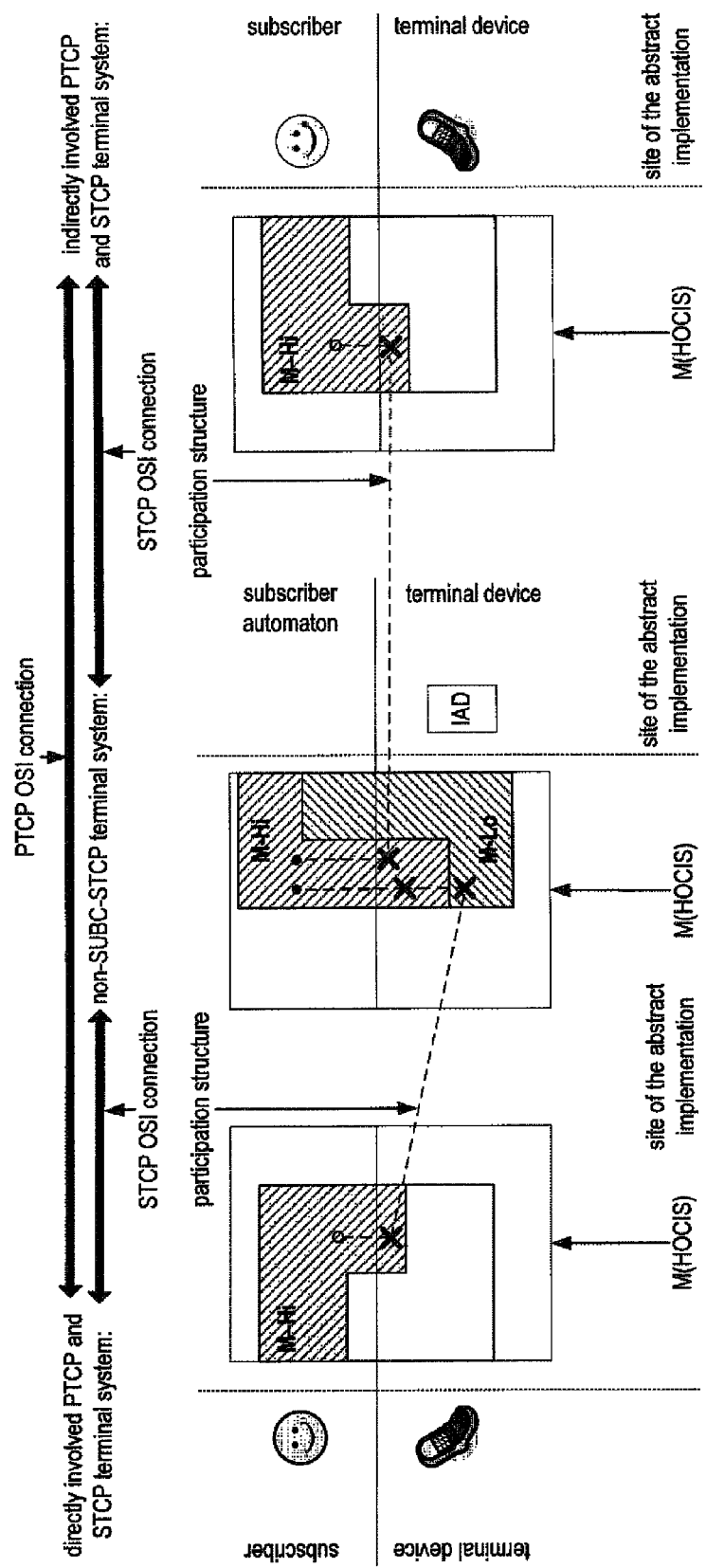
Figure 5O:
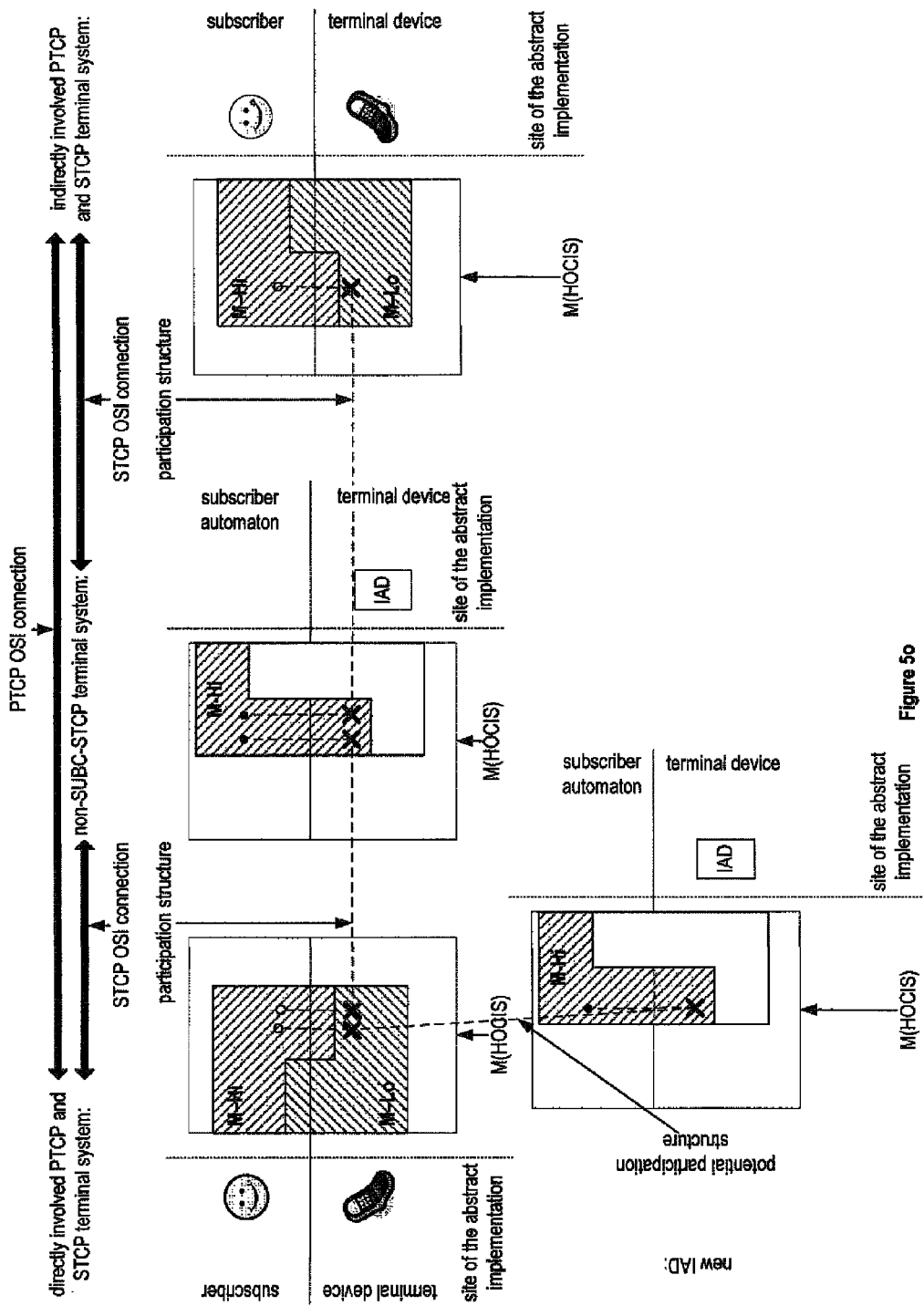
Figure 5P:
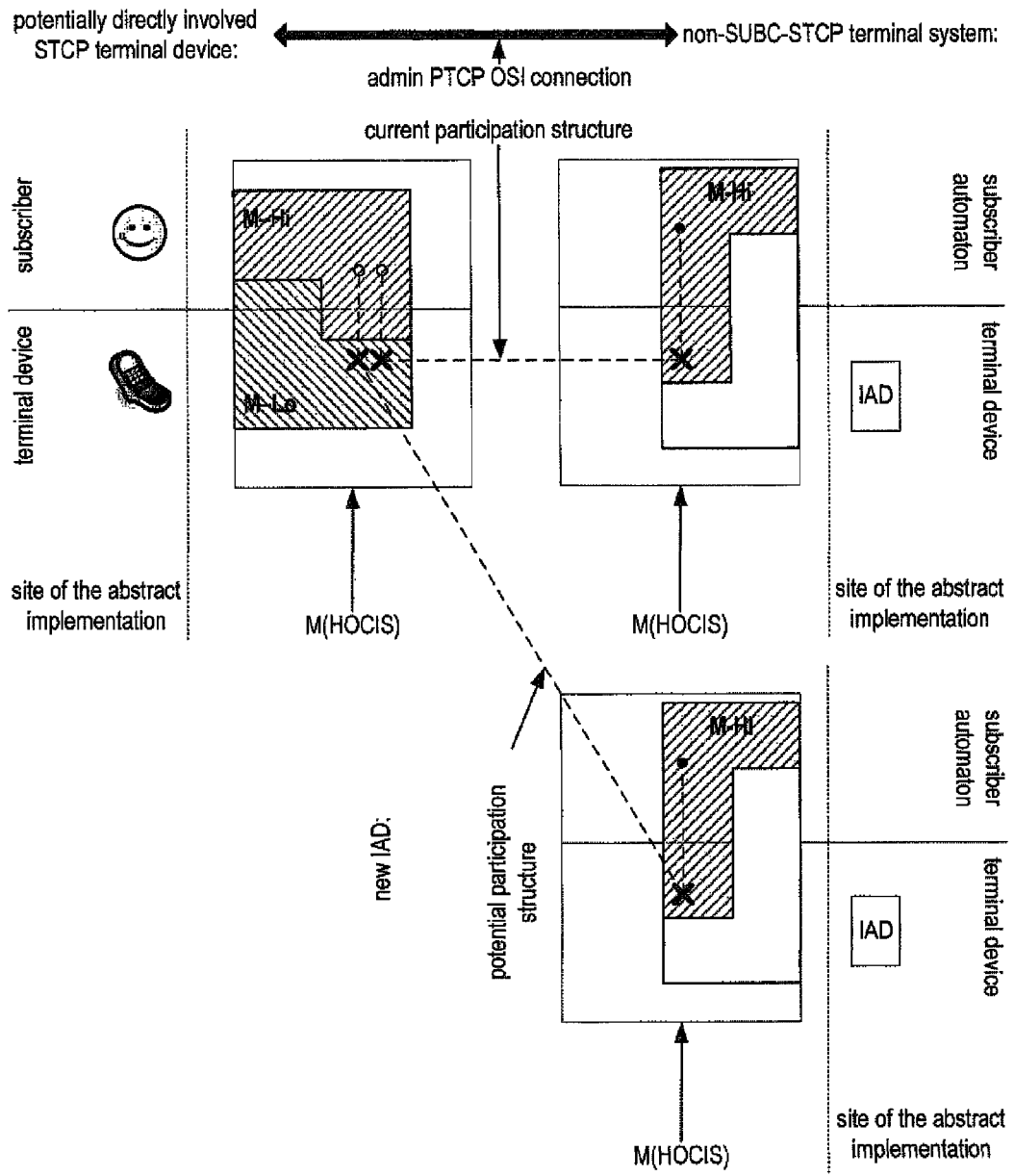

Right here reference is made to the special features as regards connectivity of a virtual M(HOCIS)/M-Lo of an STCP system: The transfer of an handover-relevant information from/through this virtual M-Lo to the PTCP-SUBC can require a relay in his STCP terminal system. This patent application regards such a relay as non-existent if it contains no additional M-Lo-functionality (otherwise it is itself an M-Lo)—it can thus regard a virtual M-Lo of a SUBC PTCP/STCP terminal system as belonging to this.

always be implemented abstractly by means of at least one abstract "PTCP channel"-suited information channel to this SUBC—in any case so long as there is any kind of connectivity of the PTCP terminal system (see the explanation re FIG. 5*p*). This also applies as a rule for a material implementation of such an abstract implementation.

also, based on its unidirectionality and its low bandwidth requirement, be implemented over a broadcast-network/network feature suitable for this.

The relevant person skilled in the art knows that in all these cases it need not follow from this that this handover-relevant information can be offered to the SUBC only in the information display of this PTCP data channel. For example: If this PTCP data channel is a voice channel, if the terminal device has suitable DTMF functionality, and if it can be programmed sufficiently flexible—which is e.g. is the case in many of the standard telephones of the present day—then it can also be offered for example textually to him. By the way, by dispensing with such an information display-conversion (when using the voice channel just mentioned to the SUBC) obviously a relay can be dispensed with in the SUBC terminal system—which makes possible the HOCIS of the users of present day standard telephones through HOCIS IADs, thus without having to modify these telephones in any way. The great economic significance of such IAD-supported HOs is apparent from claims 70-79 and the comments thereon in sub-section D.5.

Thereby not all handover-relevant information ultimately transferred to the SUBC need be made available to the virtual M-Lo in the IAD as regards a potential or current handover of its directly involved WLAN-/Femtocell telephone. Rather the definition of "handover-relevant information" allows for the fact that this M-Lo (e.g. its detection of handover-relevant information regarding the directly involved PTCP terminal system) is relocated totally or partially to at least one HOCIS server/IAD/telephone and the M-Lo information thus collectively obtained where necessary is transferred to a SUBC—thus even if handover-relevant information is contained in it which was not detected by the M-Lo of the directly involved terminal system. For claim 1 a virtual M-Lo for a directly involved STCP terminal device—in for example an STCP server/IAD—is therefore of equal value to an STCP terminal device-internal M-Lo.

I.e. more particularly: Even if a directly involved SUBC STCP terminal system of an STCP actually contains no internal M-Lo, but has however a virtual M-Lo (for example in a server/IAD/telephone) then this STCP participation structure however starts in this SUBC STCP terminal system—thus not in an STCP terminal system which contains this virtual M-Lo as a whole or in part.

The focus will now be in the following on the fact that in 5*i* no HOCIS-TCP/method (and its participation structure) was explicitly shown between the HOCIS server/IAD and the directly involved telephone—but based on the significance especially of these thus structured HOCIS TCPs alias STCPs for this written specification, these require clarification of understanding. This is now provided by the 5 FIGS. 5*j-n* in which therefore the SUBC in the directly involved STCP/PTCP terminal system has the thick border.

D.4.6.

In the two FIGS. 5*j-k* the telephone (shown on the left) is itself in turn not HOCIS-enabled, but the IAD (shown on the right) contains its virtual M-Lo already just mentioned. The relevant person skilled in the art is aware of different technical possibilities for supplying this virtual M-Lo with handover-relevant information, for example a suitable evaluation of the "signals of the PTCP" or similar within or outside of the HOCIS-IAD. In any case the HOCIS-IAD can thus operate a HOCIS-TCP for the telephone directly involved in the handover—by virtue of its virtual M-Lo (as already explained above).

In the FIG. 5*j* the virtual M-Lo of the HOCIS-IAD transfers handover-relevant information supplied by it to the M-Hi in the telephone, thus its user—and thus implements the STCP (including its OSI connection and its participation structure) between the HOCIS-IAD and the non-HOCIS telephone. If it wants to use the "voice channel" of the PTCP for this then it must be able to "write" thereon—which does not necessarily require that the voice channel is routed for this over the HOCIS-IAD because this "mixing onto" thereon of the handover-relevant information can be effected by means of a further STCP system according to claim 1, for example in/on a telecommunications network.

FIG. 5*k* differs from 5*j* in that the HOCIS-/STCP-IAD now also contains an M-Hi, i.e. an STCP-SUBC (of the STCP between this STCP-SUBC and the PTCP-/STCP-SUBC in the telephone). This STCP-SUBC determines how he uses his STCP OSI connection to the M-Hi of the directly involved SUBC—i.e. that this is not predetermined here by the virtual M-Lo, as in 5*j*. In this case the M-Hi of the IAD can act intelligently (as L7-relay between the two STCP OSI connections, one each between this STCP-IAD and the SUBC involved directly or indirectly in the handover) and ensure that for example the two STCPs for the two SUBCs do not proceed autonomously and independently of one another, but are attuned to one another in terms of contents—so that it creates from these two STCPs one single homogeneous STCP between the two STCP-/PTCP-SUBCs (thus with a single STCP OSI connection and participation structure).

It should be noted in both figures: Each M(HOCIS), for the transfer of its handover-relevant information to a telephone user, if the two are not located in the same terminal system, can use a different network from its PTCP—which naturally also applies for all previous figures.

D.4.7.

FIG. 5*l* differs from FIG. 5*k* basically only in that on the telephone side there is now also an M-Lo and thus also inter alia the detection of handover-relevant information can be carried out both in the HOCIS telephone and in the HOCIS-IAD. The participation structures of the variations of the HOCIS method made possible by this M-Lo are the same as in 5*k*, which was already substantiated further above. The corresponding analogy to this for 5*j* is obvious and is therefore omitted.

D.4.8.

In FIGS. 5*m-n* the HOCIS-IAD contains no or a virtual M-Lo for the directly involved telephone and is thus incapable or capable respectively to accomplish the detection/supplying/transfer of handover-relevant information by the directly involved telephone. The HOCIS-IAD can contain virtual M-Los for both telephones which then themselves need not both be HOCIS-enabled (i.e. need not have an internal M-Lo). In the first case this detection must thus take place in at least one of the telephones which requires for this an internal M-Lo for itself if it is to be able to detect/supply/transfer handover-relevant information about itself and/or a virtual M-Lo for the other telephone if it is to be able to detect/supply/transfer handover-relevant information about the latter. In all cases in the two M-Hi—which are shown in the figures not separate from one another, but as a common M-Hi—of the HOCIS-IAD however furthermore the "harmonisation" can take place of handover-relevant information and the transfer thereof to the two PTCP-SUBCs as regards at least one handover—for the purpose of obtaining as already just mentioned a homogeneous STCP between them as regards this handover—wherein all the OSI connections serving for this purpose can be realised over different networks or a single network and chronologically in any flexible varying way.

D.4.9.

The four FIGS. 5*o-r* model the situation that the left telephone discovers for itself a new rudimentary connectivity whilst it (5*o*) maintains a PTCP which is routed (in the part after leaving the telephone) via a WLAN (on the basis of e.g. WiFi or Femtocell technology) of an IAD or via another GSM/CDMA/UMTS/Wimax/ . . . -network, or (5*p*) maintains no PTCP but is checked into one of the networks just mentioned, or (5*q*&*r*) is checked into none of them (see section B.)—so that in all four cases it is directly involved in a potential handover. The same applies if this rudimentary connectivity is discovered not by the telephone but by a network—which is why this is not discussed again here. It should be noted that therefore the SUBC in the directly involved STCP/PTCP terminal system has the thick border.

These four cases 5*o-r* therefore and moreover only explain
 the entry of the telephone into a rudimentary connectivity—not the exit thereof,
 the possible HOCIS of the telephone user—not of a possible HOCIS-IAD SUBC
 the case where this rudimentary connectivity exists either on both sides or not at all.

The cases complementary with this—that thus at least one of the three conditions is not met—are not explained here: The HOCIS methods according to claim 1 suitable for them are equally apparent "straightforwardly" from the discussions of this section D. if they are not already shown by its figures and their obvious combinations.

The considerable importance of individual ones of these HOCIS variations was already emphasized at the end of section B. These four associated figures and their explanations now clarify the somewhat different and/or additional technical complexity which here underlies the HOCIS method, compared to the "telecommunications configurations" previously discussed. This technical complexity thereby remains fundamentally unchanged: namely directed to the assistance of the telephone user as regards an handover situation—and not to the solution of a technical problem of this handover situation (see end of section B.).

FIG. 5*o*: New Rudimentary Connectivity Whilst the Telephone is Checked in Elsewhere and Supports a PTCP.
 Basically it is possible to proceed here from any of the previously discussed telecommunications arrangements and their HOCIS participation structures—to which now the discovery of the new rudimentary connectivity is added. 5*o* stems especially from 5*m*, shows the new HOCIS-IAD (below the 5*m* telecommunications configuration) and the participation structure of the STCP OSI connection which the telephone establishes to the new HOCIS-IAD (as new STCP terminal system). It should be noted that the PTCP OSI connection—more precisely: the routing of its L3-connection—remains untouched by whether it in future is routed over this new HOCIS-IAD or furthermore over the HOCIS-IAD of the telecommunications configuration from 5*m*.

Any handover-relevant information transferred to the STCP-/PTCP-SUBC in the directly involved STCP/PTCP terminal system is in accordance with claim 1 if it is supplied by the real or a virtual M-Lo (i.e. by the M-Lo in this telephone itself or an M-Lo which for example is located in an IAD suitable for current or potential routing of the PTCP, as in 5*o*). It should thereby be noted in particular that this handover-relevant information also can

- for example be in some way or other included into one of the STCPs or into the PTCP and thus can induce the PTCP-SUBC or M-Hi in the PTCP/STCP terminal system shown on the right, to instruct anyone in the PTCP/STCP terminal system shown on the left, where necessary to carry out the handover to the new IAD, and
- the M-Lo of the PTCP/STCP terminal system shown on the left according to 5*n* can be relocated therefrom— as described above—so that its PTCP-SUBC can even experience this HOCIS if he uses a non-HOCIS-FMC telephone or even a non-FMC telephone (wherein the further respective HOCIS- and/or handover-measures which may be required and are meanwhile obvious for the relevant person skilled in the art on the basis of the understanding imparted here need not be elaborated on further), and
- the latter applies more than ever if for example the new IAD is Femtocell-capable or is a base station of another network.

FIG. 5*p*: New Rudimentary Connectivity Whilst the Telephone is Checked in Elsewhere and Supports No Actual PTCP.

Seen more precisely, here the terminal system directly involved in the potential handover can perfectly support a PTCP (as in 5*o*)—if it is namely capable for this, while checked into two networks at the same time, of supporting at the same time two PTCPs, e.g. one each over one network (which where necessary is already to be considered for the understanding of 5*o*. In particular one of these two PTCs can be an "IPTV"-TCP or "IPRadio"-TCP or another "IPbroadcast"-TCP or similar, which uses a different network or a different networks feature than the other PTCP).

It should rather also be explained here in particular about the possible consideration of the new IAD connectivity in a HOCIS method as regards a not yet existing PTCP if the terminal system indirectly involved in the potential handover does not have this aforementioned capability.

Accordingly 5*p* need only consider the IAD in which this terminal system is just checked in (and which where necessary also stands for a base station of some GSM/CDMA/UMTS/Wimax/satellite/ ... network) as well as the new IAD.

First here the understanding is required that the telephone directly involved in an handover also already supports a PTCP in this situation—when therefor there is not or not yet an "actual" PTCP between human SUBCs, as was as a rule implicitly assumed previously: That is the "admin PTCP", which the human telephone user has produced when checking in his telephone at the IAD (shown at the top right in 5*p*) between him and the automaton-SUBC of this IAD (with which since this checking in until checking out from this network he interacts explicitly and/or implicitly) and which expands the original rudimentary connectivity of the telephone (on the L1) where necessary to its internet connectivity (on the L1-L3).

Thus in this patent application an actual PTCP with a SUBC can often only start—as a rule if he is mobile— after there is for him a running admin PTCP with for example an IAD (see section B.), i.e. after successfully checking in with this IAD by means of this admin PTCP.

According to this there is already in all the previously explained FIG. 5 for the SUBC directly involved in an handover the running admin PTCP—and the following telecommunications configurations as regards the directly involved SUBC.

Even more simply/clearly apparent/given is this a priori existence of the admin PTCP (where necessary already running and then possibly in addition to an actual PTCP set up with its assistance) if it already starts a further "admin-end-to-end communications application" immediately after the checking in at the IAD (shown at the top right in 5*p*) and before the start of the first actual PTCP, in order to start if necessary only with the aid thereof at least one actual PTCP—for example a "netsurfing connection" (as this admin-end-to-end communications application) between the directly involved telephone and one of its "home IADs".

Furthermore the last paragraph (with its 3 bullet points) on the explanation to 5*o* also applies for this telecommunications configuration.

Figure 5Q:
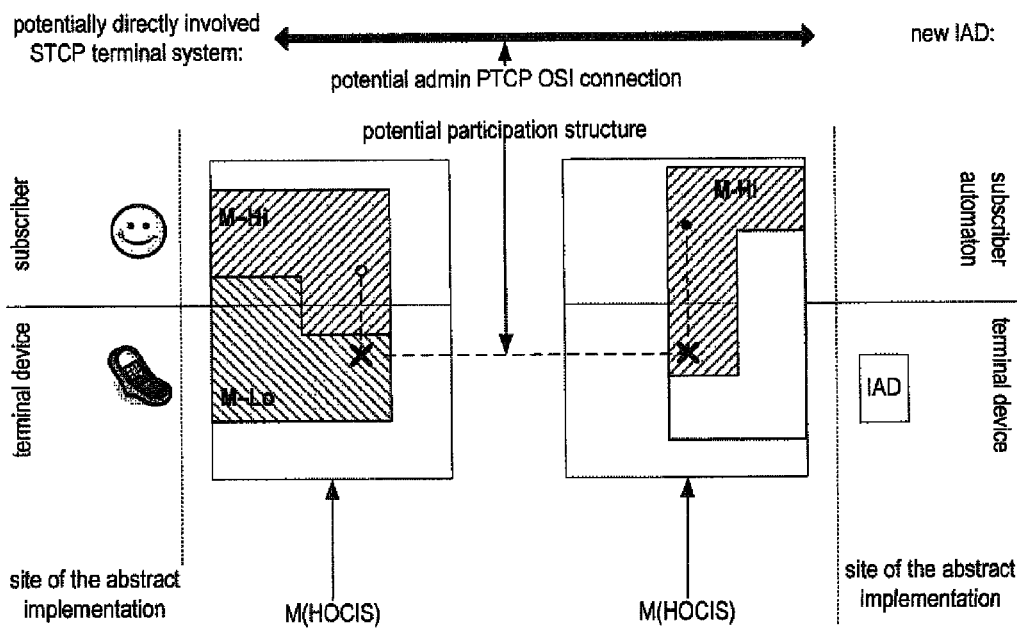
Figure 5R:
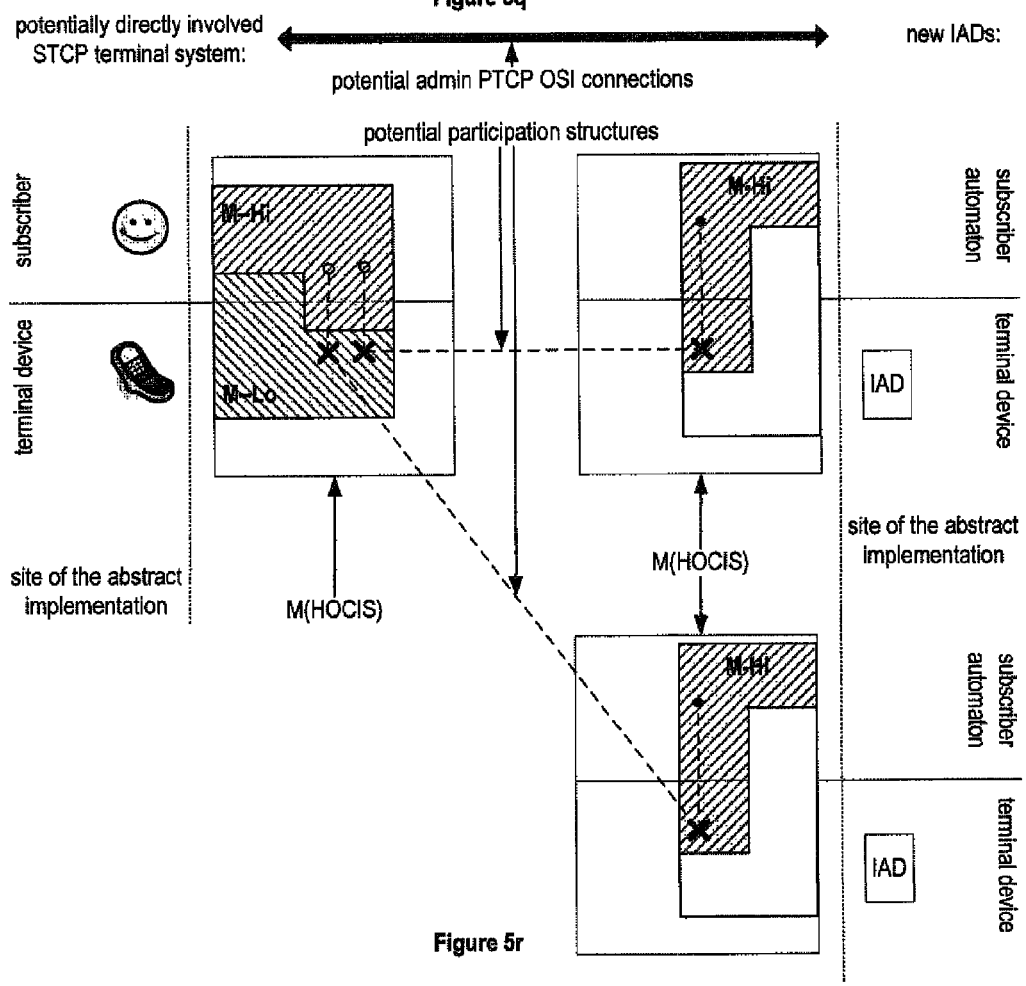

FIG. 5*q*&*r*: New Rudimentary IAD Connectivity Whilst the Telephone is not Checked in.

Seen more precisely, here the terminal system can be checked in definitely somewhere if it has the capability to be checked into two networks at the same time (so that it can support two concurrent admin PTCPs with their two IADs, one each per network at least). This terminal system—deviating from 5*p*—now does not need to be suitable to operate an actual PTCP respectively additionally at the same time over both networks, independently of one another or not.

Rather explained here is the HOCIS for a terminal system, which does not have the previously described capability, immediately after its discovery of its new rudimentary IAD connectivity (wherein the IAD in turn stands where necessary for a base station of some GSM/CDMA/UMTS/Wimax/satellite/ ... network), i.e. with its potential and/or current checking into this IAD immediately following this discovery—whereby the terminal system expands its rudimentary connectivity to the internet connectivity of its user (and supported the same straightaway for example per netsurfing communications application), as is now explained.

In order to explain this, 5*q* shows a terminal system with rudimentary connectivity only to one IAD over which (i.e.: over whose network) the former can enable internet connectivity for its SUBC—whilst 5*r* shows that it can have rudimentary connectivity to several IADs, but it can enable the internet connectivity for its SUBC nevertheless only over one of these IADs (although before actually producing this internet connectivity over just one of these IADs it discovered the production-possibility/impossibility of its internet connectivity over at least one further IAD, possibly concurrently).

After the explanation on 5*p* it can be easily seen that a terminal system even in this situation—when it is not yet checked into any network, but has already detected a rudimentary connectivity to a network—already supports a PTCP, namely the admin PTCP which was already explained in 5*p*. This admin PTCP exists by definition for the SUBC of this terminal system from the moment of the discovery of this rudimentary connectivity for/in this terminal system (see section B.). As a reminder: This admin PTCP has the objective to establish by the automated SUBC of the new IAD the internet connectivity for the (as a rule human) SUBC of the PTCP terminal system involved in the rudimentary handover—and in cooperation with this subscriber —, to maintain it and to terminate it with his checking out from this IAD.

The HOCIS during this establishing of the internet connectivity through the admin PTCP offers to the SUBC (in the PTCP terminal system which is involved in the rudimentary handover) in fact as a rule an important orientation and decision aid. This is immediately understood if one thinks that at the moment of the discovery of its new rudimentary connectivity by the PTCP terminal system, this for its SUBC—more precisely: the M-Lo of this PTCP terminal system for its SUBC—already on the one hand has started an admin PTCP (see above), on the other hand this need not be the first admin PTCP start, but at this moment at least one different concurrent admin PTCP can already have been started by this M-Lo (which can e.g. happen in the case of overlapping WLANs) as well as this SUBC of a potential internet connectivity (in some circumstances with communications application, see above) through a new IAD and its network as a rule would only then (if at all) like to learn something about the "admin STCP"—belonging to the rudimentary handover of an admin PTCP—when this internet connectivity (where necessary including communications application) can actually be established, whilst a new rudimentary connectivity is itself as a rule not of any interest to him, particularly if it does not permit using the communications application provided for it (for example not the aforementioned netsurfing connection provided for it). (It should thereby be noted that: The discovery of its rudimentary connectivity through an admin PTCP terminal system is equivalent to its discovery of the presence of a HOCIS signal through/in it, and thus equivalent to the start of the admin STCP belonging to the rudimentary handover of this PTCP), and in this case would like to be able to make use of it either fully-automated or by simplest activity, i.e. for example by "zero touch" or "one touch" or similar of at least one device in at least one of its SUBC PTCP and/or SUBC STCP terminal systems.

The previous explanations show unmistakeably that the HOCIS method provides the users for example of a telephone with actually important orientation/decision aids and simplification if he wants to use the HOs of the different variations or wants to evaluate them or avoid them or question them or . . . or has to accept them which are outlined in the FIG. 5 and explained above. In view of the ubiquitous and permanent flooding foreseeable for the economic regions of everybody and anywhere by telecommunications services offers on the one hand and on the other hand in view of the permanently growing unavoidable mobility of all persons in these regions and even their rapidly growing populations the telecommunications configurations 5o-r (and the understanding thereof) are particularly important: from them it is particularly clearly apparent that and how the HOCIS method and the telecommunications terminal devices equipped with them makes it more easy for mobile telecommunications services users to utilise this flood in the simplest way possible—by namely making it possible to keep from them all telecommunications technical details and information (such as information regarding their rudimentary connectivities) and to provide them with handover-"convenience information support" which is more automated, is expected by the laymen in the art of telecommunications technology and can be configured to meet his requirements (such as handover decision options which were previously checked and considered good for the user invisibly as regards their technical and economical quality, and can be used automated or by one-touch of the telecommunications terminal device by the users thereof—whereby he is spared the biggest part of the psychic and physic complexity as well as the mental far-ranging incompleteness which would be provided in the present-day user interfaces for dealing with this flood).

D.4.10.

From the previous discussions on special examples of participation structures of the HOCIS OSI connections it should be clear: they only simplify the obtaining of an extensive and precise understanding of the essence of the HOCIS method/s. However these explanations above should also show by way of example that for each of the many HOCIS methods according to the invention there is again a number of abstract implementation variations, wherein these cover in particular the most varied of distributions of HOCIS functionalities to further servers and telecommunications networks.

D.4.11.

After this discussion on such participation structures given by way of example there now follows some general remarks/reminders—already in part redundant—on the HOCIS method according to the invention and its starting conditions.

The transfer of handover-relevant information alias HOCIS information alias STCP information to a PTCP-SUBC can for its target PTCP or STCP terminal device Take place largely transparently (=invisibly), by being transferred by the module which supplies it for transfer to a SUBC in a SUBC or other terminal system inter alia in the PTCP language of this SUBC and over the network used by the PTCP so that at least one device of this target PTCP/STCP terminal system lying below this SUBC cannot identify it as HOCIS information but only this PTCP-SUBC, and take place visibly, i.e. by an M-Lo transferring it to an M-Lo of the target PTCP or STCP terminal device as HOCIS-PDU (and possibly even also over another network than that used by the PTCP), and only the latter M-Lo extracting a subscriber-perceivable handover-relevant information therefrom and transferring it to the PTCP-SUBC.

A secondary telecommunications process must at least once transfer handover-relevant information of a non-human M(HOCIS) to a PTCP-SUBC at some time. Whether and when information thus handed over is handover-relevant or not does not need now be explained in detail here—it is sufficient that this is as a rule obvious and in any case the relevant person skilled in the art can recognise this in disputed cases. He will then in particular take into consideration that an handover-relevant information can appear in a number both of the most different codings and/or different displays and also the most different combinations/overlappings with others and/or the most different filters/projections to other information of which none makes it into non-handover-relevant information, so long as its target SUBC can ultimately recognise it as such.

This transfer of handover-relevant information to the PTCP-SUBC can require its transmission—preceding it—over at least one network in its PTCP/STCP terminal system, thus "take place indirectly" wherein the modalities of such a transmission are irrelevant for a HOCIS method (and the transfer over a network is irrelevant, if the handover-relevant information is transferred by a virtual M(HOCIS), see the explanation on FIG. 5i). This situation happens if the PTCP-SUBC is indirectly involved this handover.

"take place directly" insofar as it can have arisen in its PTCP/STCP terminal system itself (or in at least one of its virtual M(HOCIS), see the explanation on FIG. 5i). This situation happens if the PTCP-SUBC is directly involved in this handover. The directly transferred handover-relevant information is then the result of its (or its virtual M(HOCIS)) at least one "HOCIS attempts" over at least one network with at least one paired M(HOCIS) to establish a "HOCIS connection", i.e. a "HOCIS OSI connection" which is suitable and capable of transferring to the SUBC at least one handover-relevant information—as explained in section B.—(otherwise it is not a HOCIS OSI connection).

I.e. that the M(HOCIS) of its PTCP/STCP terminal system (or its virtual M(HOCIS)) sent out at least one PDU to the latter system in order to improve its current connectivity to the latter. The result of such an active communications attempt of this M(HOCIS)—in order to ensure the receipt of handover-relevant information—can happen quite differently: E.g. it can not receive the at least one HOCIS PDU anticipated by it in order to be able to work further on improving this SUBC connectivity to the latter system, or carry out some protocols and improve the SUBC connectivity to the "HOCIS connectivity" on the basis of a HOCIS OSI connection.

In all cases a transfer of an handover-relevant information—originating from this M(HOCIS)—and containing this result to the PTCP-SUBC can take place.

The text passages in brackets in the previous paragraph thus explicitly refer to the fact that a virtual M(HOCIS) of a SUBC PTCP/STCP terminal system or one of its at least one PTCP-SUBCs can have started a HOCIS attempt. It is then called "virtual HOCIS attempt", otherwise "real HOCIS attempt" of this system/SUBC. In a virtual HOCIS attempt the virtual M(HOCIS) can be located for example in an IAD, in whose WLAN a non-HOCIS FMC telephone is currently checked in—and the "direct transfer" of the handover-relevant information to the PTCP-SUBC (telephone user) would then as a rule take place over its voice channel. (These transfer aspects are dealt with again and in more detail in the comments on claim 80.)

Particularly with regard to the meaning of the term "HOCIS signal" it is pointed out/reminded:

A HOCIS signal is as handover-relevant information—just like any HOCIS-PDU, HOCIS-SDU, HOCIS— . . . —an abstract bearer of digitally displayed information to/by/for an handover—as already detailed in Section B.—and can contain "value parameters" and/or "reference parameters". The former contain its parameter value itself, whilst the latter refer to this value or the place identified in it. So that such an handover signal exists in at least one terminal system no value of its possible at least one reference parameter need be provided there.

The presence of a HOCIS signal or the supplying of a handover-relevant information in a terminal device/system comes about through its local generation and/or local obtaining and/or its receipt over a network whose technical and time modalities need not be discussed here.

Obtaining/receiving/transmitting a HOCIS signal or handover-relevant information in this way can take place from or to a process/service/application which has nothing directly to do with the HOCIS method according to the invention and which is therefore not considered here. However such a process/service/application uses the method according to the invention through this local or non-local obtaining/transferring or sending/receiving over a network, even if it only concerns a part-HOCIS signal or an handover-relevant part information (then however possibly not solely responsible).

Furthermore it is reminded here that the terms HOCIS process (alias HOCIS TCP) and STCP in this written specification are synonyms—thus both need not be in particular "two-SUBC processes", i.e. can be "n-SUBC processes", with n≠2.

A reminder is also given to the reference at the end of section B. that the method according to the invention cannot only assist PTCP-SUBCs indirectly involved in an handover of a PTCP, but also a PTCP-SUBC directly involved in this handover: the case "j." corresponds to an indirectly involved SUBC, the case "jj." to a directly involved SUBC.

D.4.12.

As already discussed at the end of sub-section D.4.1. the wordings/meanings of this patent application—for reasons of simplifying them—can dispense with the assistance of sub-dividing an M(HOCIS) into M-Lo and M-Hi. The explanations above of this sub-section D.4. namely lead to the conclusion that the essential point of the features described by them can be captured by means of some simple M(HOCIS)-attributes. For this purpose the following are defined:

A "complete"—M(HOCIS) stands for one or more of the following defined M(HOCIS).

An "intelligent" M(HOCIS) stands for its M-Hi-functionality defined above.

A "non-intelligent" M(HOCIS) stands for its M-Lo functionality defined above.

The demarcation between both functionalities is important: Any M(HOCIS) function in the execution of which no human participates or needs to participate—which in any case the relevant person skilled in the art can judge—may be regarded in this patent application as M-Lo function (even if the type of its "intelligence" should be assumed somehow "human" to one or the other) and then belongs to its non-intelligent M(HOCIS). "A non-human M(HOCIS)" is thus a synonym for "a non-intelligent M(HOCIS)".

A "virtual" M(HOCIS) stands for its virtual M-Lo functionality defined above (in the explanation on FIG. 5i) and its locality—is thus by definition non-intelligent.

These "intelligent/non-intelligent M(HOCIS)" terms can replace in all the preceding explanations the "M-Lo/M-Hi" terms 1-to-1.

To conclude these sub-sections D.2.-D.4. it is pointed out that the wording abbreviations practiced in the dependent claims compared to the claim 1 wording are only to simplify reading them—particularly by leaving out sometimes the obtrusive set phrase "at least"—thus have nothing to do with a generalisation of the meaning.

It should be noted: This abstract construction of an abstract HOCIS apparatus and its terminal systems at PTCP-SUBCs also permits material implementations alias embodiments of an abstract HOCIS apparatus terminal system at a PTCP-SUBC wholly or partially in a there independent material HOCIS terminal device (i.e. need not be located in at least one physical PTCP terminal system provided there anyhow). Such a separateness of material PTCP and/or HOCIS terminal devices can—but need not—be traced back to the fact that they would be incapable for material technical reasons of resource sharing (This is e.g. the case as a rule with a present day "only WLAN telephone" and an "only GSM telephone" isolated therefrom, between which a PTCP changes in an handover). Other reasons for this separateness can be incompatibilities of all kinds between PTCP and/or STCP modules, but in the future possibly also be the wish of a SUBC to receive all HOCIS and all handover-relevant information about all of his PTCPs in an appropriately integrated way at least one HOCIS device which is particularly suited for this, which for convenience reasons therefore should be separated from the at least one as a rule differently designed PTCP terminal device (which in turn can maintain several simultaneous different type PTCPs via possibly different type networks/access points/services features).

It should next be confirmed that the two functions of a HOCIS apparatus "indirect or direct transfer (of an handover-relevant information through any means to a SUBC)" and "direct use (of the means transferring an handover-relevant information by a SUBC)" each cause that which they intuitively suggest:

The "direct transfer" of an handover-relevant information through an M(HOCIS) means or supplying means to a SUBC has the effect that it carries out this transfer directly to the SUBC—which is only possible if this SUBC and this means belong to the same OSI terminal system or this means is its virtual M(HOCIS) (see the above explanation on FIG. 5*i*).

Otherwise—namely the SUBC and means do not belong to the same OSI terminal system and the means is not a virtual M(HOCIS) of the SUBC OSI terminal system—its transfer by the means to the SUBC requires to switch a paired means between the two in the SUBC OSI terminal system and is therefore an "indirect transfer".

The invention claimed is:

1. A method for providing handover convenience information support (HOCIS) to subscribers of a telecommunications network participating in a primary telecommunications process (PTCP), comprising:
providing by a HOCIS module HOCIS information to any participating subscriber in a secondary telecommunications process (STCP) via a STCP network, wherein said HOCIS module does not require any handover related service information from the telecommunications network used by the PTCP, wherein
said HOCIS module is neither part of or usable by the telecommunication network,
said HOCIS module is subdivided into a Lo-module and a Hi-module, which cooperate with each other according to a selected participation structure of the STCP, in which a Lo-module supplies HOCIS information and transfers it over a STCP network, and a Hi-module interacts with said subscriber, and HOCIS information provides to said subscriber information relating to states of handovers in said PTCP so as to guide the subscriber through handovers in said PTCP in accordance with the participation structure,
and wherein the method further comprises
checking for the presence of a signal representing a handover of the PTCP, and
in response to detection of said signal, initiating cooperation between said Lo-module and said Hi-module in accordance with said participation structure such that said Lo-module supplies said HOCIS information and transfers it over a STCP network, and said Hi-module receives said HOCIS information from said Lo-module and interacts with said subscriber through HOCIS information according to said selected participation structure;
wherein HOCIS information is provided to all subscribers of the PTCP, wherein subscribers of the same PTCP process participate in different STCPs, and wherein a Hi-module is part of a mobile device.

2. The method of claim 1, wherein the subscriber is indirectly involved in the handover.

3. The method of claim 1, wherein said signal and HOCIS information is generated by a PTCP participant.

4. The method of claim 1, wherein said HOCIS module is at least partially implemented in a server.

5. The method of claim 1, wherein said HOCIS module is at least partially implemented in an internet access device.

6. The method of claim 1, wherein said HOCIS module is at least partially implemented in a subscriber's communication terminal device.

7. A system for providing handover convenience information support (HOCIS) to subscribers of a telecommunications network participating in a primary telecommunications process (PTCP), comprising:
a HOCIS module, comprising a processor, providing HOCIS information to any participating subscriber in a secondary telecommunications process (STCP) via a STCP network, wherein said HOCIS module does not require any handover related service information from the telecommunications network used by the PTCP, wherein
said HOCIS module is neither part of or usable by the telecommunication network,
said HOCIS module is subdivided into a Lo-module and a Hi-module, which cooperate with each other according to a selected participation structure of the STCP, in which a Lo-module supplies HOCIS information and transfers it over a STCP network, and a Hi-module interacts with said subscriber, and HOCIS information provides to said subscriber information relating to states of handovers in said PTCP so as to guide the subscriber through handovers in said PTCP in accordance with the participation structure, wherein
in response to detection of a signal representing a handover of the PTCP, said Lo-module and said Hi-module initiate cooperation with each other in accordance with said participation structure such that said Lo-module supplies said HOCIS information and transfers it over a STCP network, and said Hi-module receives said HOCIS information from said Lo-module and interacts with said subscriber through HOCIS information according to said selected participation structure;

wherein HOCIS information is provided to all subscribers of the PTCP, wherein subscribers of the same PTCP process participate in different STCPs, and wherein a Hi-module is part of a mobile device.

8. The system of claim 7, wherein the subscriber is indirectly involved in the handover.

9. The system of claim 7, wherein said signal and HOCIS is generated by a PTCP participant.

10. The system of claim 7, wherein said HOCIS module is at least partially implemented in a server.

11. The system of claim 7, wherein said HOCIS module is at least partially implemented in an internet access device.

12. The system of claim 7, wherein said HOCIS module is at least partially implemented in a subscriber's communication terminal device.

* * * * *